United States Patent
Monteuuis et al.

(10) Patent No.: US 12,555,476 B2
(45) Date of Patent: Feb. 17, 2026

(54) SECURED MANAGEMENT OF MANEUVER IDENTIFICATIONS (IDS)

(71) Applicant: QUALCOMM Incorporated, San Diego, CA (US)

(72) Inventors: Jean-Philippe Monteuuis, Northborough, MA (US); Jonathan Petit, Wenham, MA (US); Seung Ryul Yang, San Diego, CA (US); Cong Chen, San Diego, CA (US); Mohammad Raashid Ansari, Lowell, MA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/161,706

(22) Filed: Jan. 30, 2023

(65) Prior Publication Data
US 2023/0282109 A1    Sep. 7, 2023

Related U.S. Application Data

(60) Provisional application No. 63/315,417, filed on Mar. 1, 2022.

(51) Int. Cl.
*G08G 1/0967* (2006.01)
*H04W 4/40* (2018.01)

(52) U.S. Cl.
CPC ......... *G08G 1/096766* (2013.01); *H04W 4/40* (2018.02)

(58) Field of Classification Search
CPC ........................ G08G 1/096766; H04W 4/40
See application file for complete search history.

(56) References Cited

U.S. PATENT DOCUMENTS

2018/0020008 A1\* 1/2018 Schoof ............... H04L 63/0876
2019/0098471 A1   3/2019 Rech et al.
(Continued)

FOREIGN PATENT DOCUMENTS

| WO | 2018108293 A1 | 6/2018 |
|----|---------------|--------|
| WO | 2021092039 A1 | 5/2021 |

OTHER PUBLICATIONS

International Search Report and Written Opinion—PCT/US2023/061672—ISA/EPO—Jun. 26, 2023.
(Continued)

*Primary Examiner* — Ajay Cattungal
(74) *Attorney, Agent, or Firm* — QUALCOMM Incorporated

(57) ABSTRACT

Systems and techniques are described for securely managing maneuver identifications (IDs) for vehicle-based communications. For example, a method may include transmitting a message associated with a potential maneuver by the vehicle, determining a maneuver identification (ID) for the potential maneuver based on the message, and transmitting a first maneuver message (including the maneuver ID) for the potential maneuver. In another example, a method may include receiving a first maneuver message including a maneuver ID, determining that the first maneuver ID is a new maneuver ID, and determining, based on the first maneuver ID being a new maneuver ID, whether the first maneuver ID matches a second maneuver ID determined based on a previously-received message. In another example, a method may include receiving maneuver messages that include a same maneuver identification (ID) and one or more source IDs and determining whether the source ID(s) of the maneuver messages match.

32 Claims, 24 Drawing Sheets

(56) References Cited

U.S. PATENT DOCUMENTS

| | | | |
|---|---|---|---|
| 2019/0245872 A1* | 8/2019 | Shin | H04L 63/1425 |
| 2021/0245758 A1* | 8/2021 | Ahmad | G08G 1/167 |
| 2021/0364310 A1 | 11/2021 | Rolf et al. | |
| 2022/0105954 A1* | 4/2022 | Li | H04W 76/14 |
| 2022/0219721 A1* | 7/2022 | Pfadler | B60W 60/001 |
| 2022/0332350 A1* | 10/2022 | Jha | H04W 4/023 |
| 2024/0078903 A1* | 3/2024 | Park | H04L 63/0442 |
| 2024/0135809 A1* | 4/2024 | Li | G08G 1/0116 |

OTHER PUBLICATIONS

Liu X., et al., "MISO—V: Misbehavior Detection for Collective Perception Services in Vehicular Communications", IEEE Intelligent Vehicles Symposium (IV), Nagoya, Japan, Jul. 11, 2021, XP034005588, pp. 369-376, Section III.D.

* cited by examiner

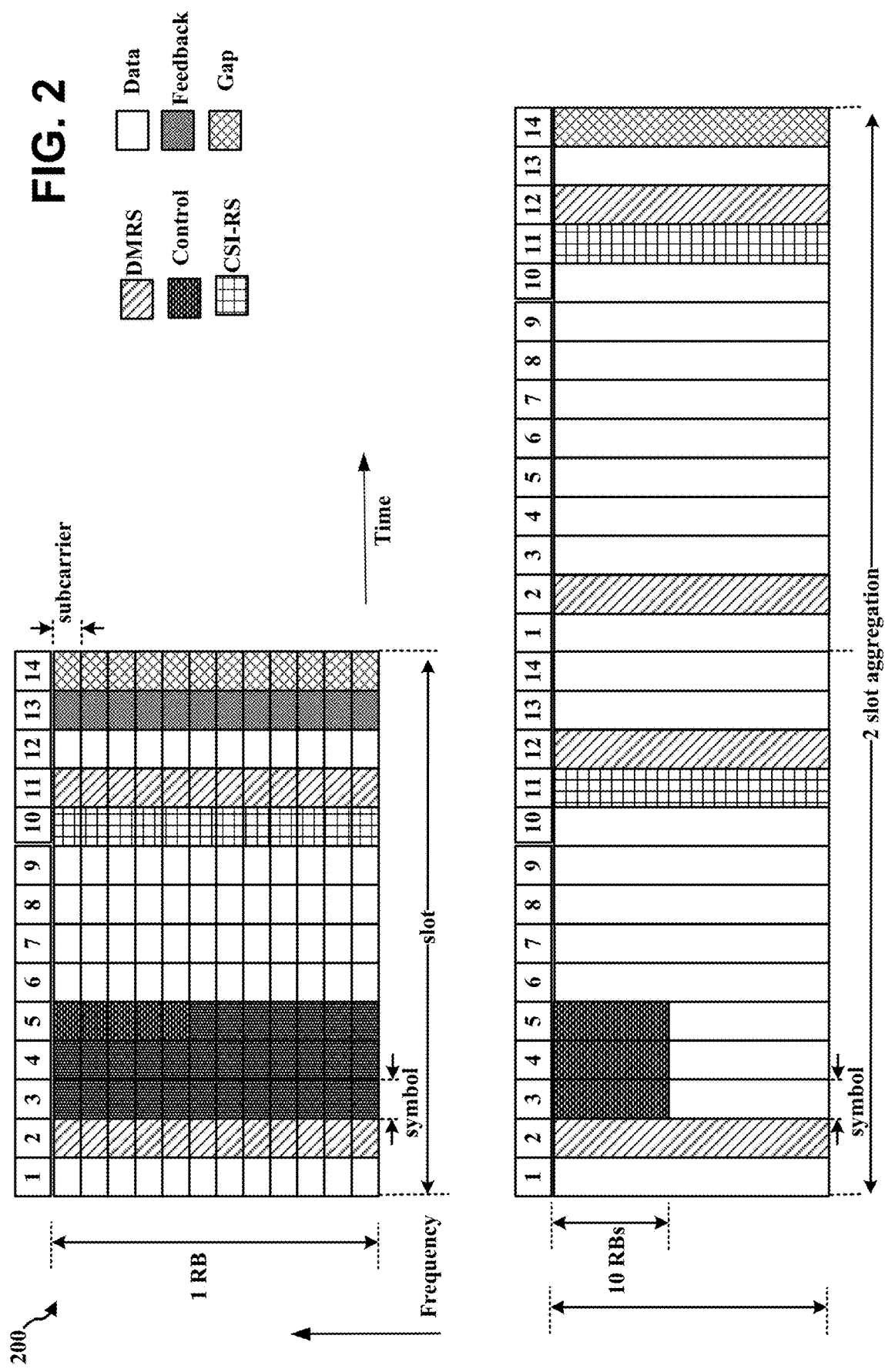

SECURED MANAGEMENT OF MANEUVER IDENTIFICATIONS (IDS)

CROSS-REFERENCE TO RELATED APPLICATIONS

This application claims the benefit of U.S. Provisional Application No. 63/315,417, filed Mar. 1, 2022, which is hereby incorporated by reference, in its entirety and for all purposes.

FIELD

The present disclosure relates generally to communication systems. For example, aspects of the present disclosure relate to a configuration for securely managing maneuver identifications (IDs) for vehicle-based communications, such as vehicle-to-everything (V2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC).

Some aspects of 5G NR may be based on the 4G Long Term Evolution (LTE) standard. Aspects of wireless communication may comprise direct communication between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for securely managing maneuver IDs for vehicle-based communications (e.g., V2X communications). According to at least one example, a method for wireless communications at a vehicle is provided. The method includes: transmitting, at the vehicle, a message associated with a potential maneuver by the vehicle; determining, at the vehicle, a maneuver identification (ID) for the potential maneuver based on the message; and transmitting, at the vehicle, a first maneuver message for the potential maneuver, the first maneuver message including the maneuver ID.

In another example, an apparatus for wireless communications is provided that includes a memory (e.g., configured to store data, such as virtual content data, one or more images, etc.) and one or more processors (e.g., implemented in circuitry) coupled to the memory. The one or more processors are configured to and can: transmit a message associated with a potential maneuver by the vehicle; determine a maneuver identification (ID) for the potential maneuver based on the message; and transmit a first maneuver message for the potential maneuver, the first maneuver message including the maneuver ID.

In another example, a non-transitory computer-readable medium is provided that has stored thereon instructions that, when executed by one or more processors, cause the one or more processors to: transmit a message associated with a potential maneuver by the vehicle; determine a maneuver identification (ID) for the potential maneuver based on the message; and transmit a first maneuver message for the potential maneuver, the first maneuver message including the maneuver ID.

In another example, an apparatus for wireless communications is provided. The apparatus includes: means for transmitting a message associated with a potential maneuver by the vehicle; means for determining a maneuver identification (ID) for the potential maneuver based on the message; and means for transmitting a first maneuver message for the potential maneuver, the first maneuver message including the maneuver ID.

According to at least one additional or alternative example, a method is provided for wireless communications. The method includes: receiving, at the first vehicle, a first maneuver message from a second vehicle, the first maneuver message including a first maneuver identification (ID); determining, at the first vehicle, that the first maneuver ID of the first maneuver message is a new maneuver ID; and determining, at the first vehicle based on the first maneuver ID being a new maneuver ID, whether the first maneuver ID matches a second maneuver ID determined based on a previously-received message.

In another example, an apparatus for wireless communications is provided that includes a memory (e.g., configured to store data, such as virtual content data, one or more images, etc.) and one or more processors (e.g., implemented in circuitry) coupled to the memory. The one or more processors are configured to and can: receive a first maneuver message from a vehicle, the first maneuver message including a first maneuver identification (ID); determine that the first maneuver ID of the first maneuver message is a new maneuver ID; and determine, based on the first maneuver ID being a new maneuver ID, whether the first maneuver ID matches a second maneuver ID determined based on a previously-received message.

In another example, a non-transitory computer-readable medium is provided that has stored thereon instructions that, when executed by one or more processors, cause the one or more processors to: receive a first maneuver message from a vehicle, the first maneuver message including a first maneuver identification (ID); determine that the first maneuver ID of the first maneuver message is a new maneuver ID; and determine, based on the first maneuver ID being a new maneuver ID, whether the first maneuver ID matches a second maneuver ID determined based on a previously-received message.

In another example, an apparatus for wireless communications is provided. The apparatus includes: means for receiving a first maneuver message from a vehicle, the first maneuver message including a first maneuver identification (ID); means for determining that the first maneuver ID of the first maneuver message is a new maneuver ID; and means for determining, based on the first maneuver ID being a new maneuver ID, whether the first maneuver ID matches a second maneuver ID determined based on a previously-received message.

According to at least one additional or alternative example, a method is provided for wireless communications. The method includes: receiving, at the vehicle, a plurality of maneuver messages from one or more vehicles, the plurality of maneuver messages including a same maneuver identification (ID) and one or more source IDs; and determining, at the vehicle, whether the one or more source IDs of the plurality of maneuver messages match.

In another example, an apparatus for wireless communications is provided that includes a memory (e.g., configured to store data, such as virtual content data, one or more images, etc.) and one or more processors (e.g., implemented in circuitry) coupled to the memory. The one or more processors are configured to and can: receive a plurality of maneuver messages from one or more vehicles, the plurality of maneuver messages including a same maneuver identification (ID) and one or more source IDs; and determine whether the one or more source IDs of the plurality of maneuver messages match.

In another example, a non-transitory computer-readable medium is provided that has stored thereon instructions that, when executed by one or more processors, cause the one or more processors to: receive a plurality of maneuver messages from one or more vehicles, the plurality of maneuver messages including a same maneuver identification (ID) and one or more source IDs; and determine whether the one or more source IDs of the plurality of maneuver messages match.

In another example, an apparatus for wireless communications is provided. The apparatus includes: means for receiving a plurality of maneuver messages from one or more vehicles, the plurality of maneuver messages including a same maneuver identification (ID) and one or more source IDs; and means for determining whether the one or more source IDs of the plurality of maneuver messages match.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle (e.g., an automobile or truck), a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 2 illustrate example aspects of a sidelink slot structure, in accordance with some aspects of the present disclosure.

DETAILED DESCRIPTION

Figure 1:
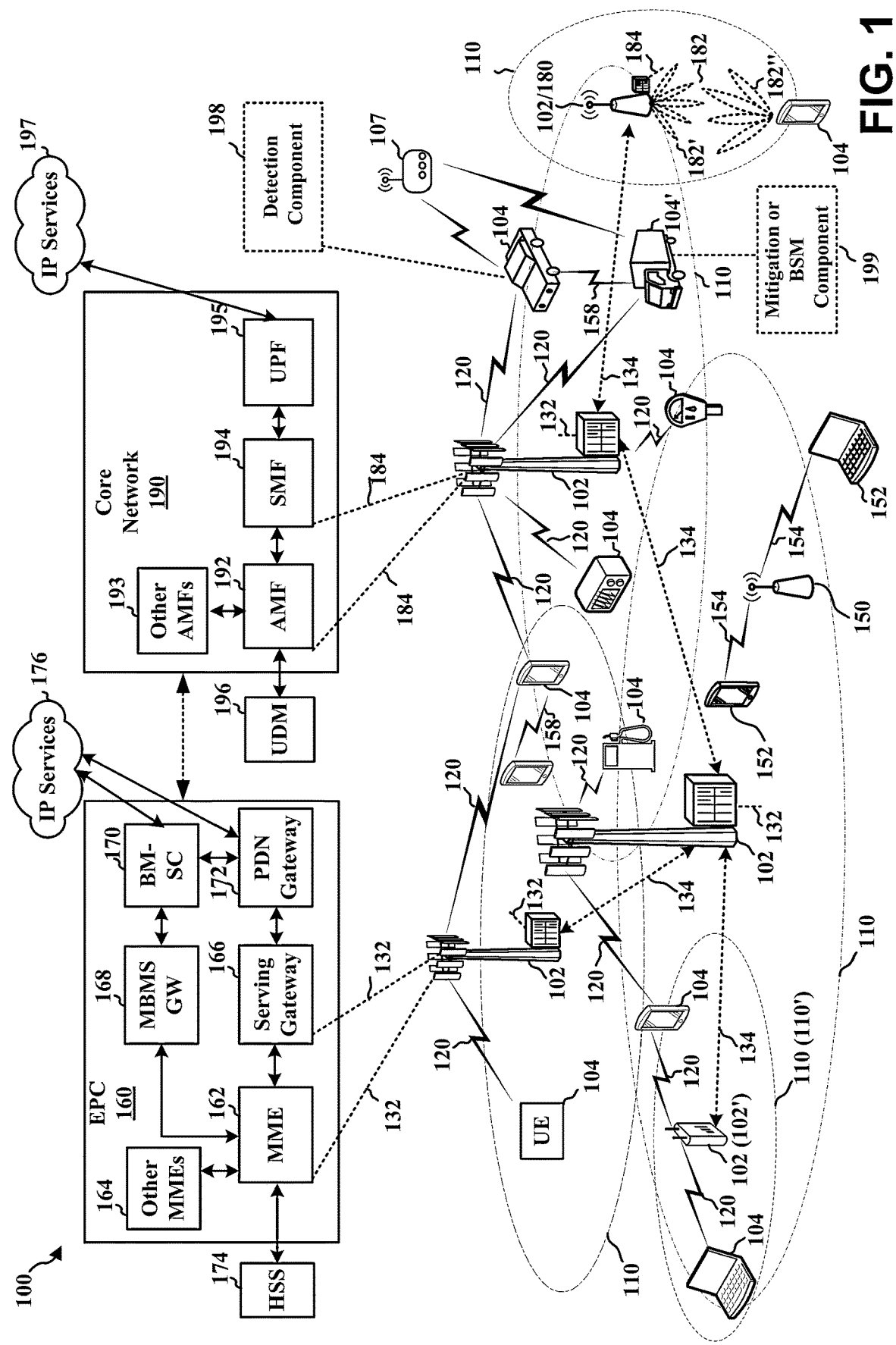
FIG. 1 is a diagram illustrating an example of a wireless communications system and an access network, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A 5G mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of devices or systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, and/or traffic infrastructure. The information may be transmitted using one or more vehicle-based messages, such as C-V2X messages, which can include Sensor Data Sharing Messages (SDSMs), Basic Safety Messages (BSMs), Cooperative Awareness Messages (CAMs), Collective Perception Messages (CPMs), and/or other type of message. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming potential road dangers (e.g., unforeseen oncoming vehicles, accidents, and road conditions) from the other vehicles. Vehicle-based messages (e.g., SDSMs, BSMs, CAMs, and CPMs) are beneficial because they can provide an awareness and understanding to the vehicles of the upcoming potential road dangers.

The IEEE 802.11p Standard supports uses a dedicated short-range communications (DSRC) interface for V2X wireless communications. Characteristics of the IEEE 802.11p based DSRC interface include low latency and the use of the unlicensed 5.9 Gigahertz (GHz) frequency band. Cellular V2X (C-V2X) was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band.

In recent years, there has been a great deal of research and development related to automated driving using V2X communications with a key focus area on the enhancement of traffic safety and efficiency. Autonomous driving is performed using sensors for object detection, path planning, and actuation. Research to improve safety and efficiency is being developed for each of these processes. Various organizations are carrying out autonomous automatic driving development by using V2X technology to make driving safer and more efficient. These organizations have defined network architectures and messaging for V2X. For example, the SDSM, BSM, CAM, and CPM are V2X messages that are used by vehicles to provide real-time information about their status and in some cases to share real-time information about the vehicle's surroundings. These messages (e.g., SDSM, BSM, CAM, and CPM) are not designed for cooperative path planning, which requires the inclusion of future (planned) information for overall optimal path planning.

The future (planned) information for optimal path planning should comprise a listing of the vehicle's planned positions over time (i.e., the planned trajectory). A maneuver sharing coordination message (MSCM) (e.g., MSCM 1400 of FIG. 14) is a V2X message that can be used for the exchange of planned trajectories amongst vehicles for performing driving coordination. The MSCM allows for the vehicles to coordinate their planned maneuvers for safer and more efficient driving. It should be noted that the MSCM format is still undergoing development.

The MSCM relies on a maneuver identification (ID) (e.g., Maneuver ID 1414 of FIG. 14 described below). In some cases, the maneuver ID may be similar to a session ID, and can allow for maneuver participant vehicles to track updates for a specific maneuver. Currently, there is no solution proposed in the standards (e.g., Society of Automotive Engineering (SAE) standards, such as SAE J1386) for generating unique maneuver IDs. The maneuver IDs should be unique so as to avoid any possible maneuver ID collisions (e.g., occurring when two or more maneuvers have the same maneuver ID), which can lead to the cancelation of the maneuvers. A generation method providing a non-unique maneuver ID can lead to the cancelation (or abortion) of the maneuver.

In some cases, a random number generator may be used to generate a random value for a maneuver ID for a MC SM. However, using a random number generator to generate the random value for the maneuver ID may not prevent the risk of colliding maneuver IDs because the random value may not necessarily be unique. In some other cases, a vehicle's digital certificate may be used to generate a maneuver ID. However, the use of the vehicle's digital certificate for generating the maneuver ID may be problematic because the vehicle may need to generate more maneuver IDs than digital certificates, and the digital certificate is typically already used (e.g., hashed) to generate a source ID (e.g., Source ID 1410 of FIG. 14) of the MSCM.

Currently, there is also no available solution or technique (e.g., no detector) for detecting attacks relating to colliding maneuver IDs. Attacks relating to colliding maneuver IDs can lead to several maneuver cancellations (or maneuver abortions). As such, undetected attacks relating to colliding maneuver IDs can lead to a deficient management of the traffic (e.g., because multiple maneuvers will be canceled).

In some aspects of the present disclosure, systems, apparatuses, methods (also referred to as processes), and computer-readable media (collectively referred to herein as "systems and techniques") are described herein for securely managing maneuver IDs for vehicle-based communications, such as V2X communications. The systems and techniques effectively increase the safety and efficiency of traffic by providing a unique maneuver ID for each maneuver and by providing misbehavior detection and reporting (MBDS) for maneuver ID collision.

In some aspects, a vehicle or other device may determine or generate of a unique maneuver ID for each maneuver the vehicle or other device plans to perform. The vehicle can determine a unique maneuver ID for a particular maneuver (and corresponding maneuver session) based on a preceding message, such as a BSM or a maneuver message indicating an intent to perform the particular maneuver (e.g., a MSCM type zero (0)), which is referred to herein as a maneuver message of intent. The preceding message can be transmitted prior to a maneuver message (e.g., a MSCM) with which the unique maneuver ID will be included. In some cases, to determine the unique maneuver ID based on the preceding message, the vehicle can apply a hashing algorithm to the preceding message to generate a hashed message (or hash code) that may be utilized as the maneuver ID for the maneuver message (e.g., the MSCM). The hash code (or value) resulting from the hashing algorithm can provide a unique value that can prevent the possibility of maneuver ID collisions for different maneuver sessions. In some cases, the preceding message itself (e.g., a BSM or maneuver message of intent) may be too large in size for the maneuver ID field of the maneuver message (e.g., the MSCM). However, the hash code generated from the hashing of the preceding message is significantly smaller in size than the size of the preceding message itself, and is small enough in size to fit within the maneuver ID field of the maneuver message (e.g., the MSCM). While a hashing algorithm is described herein as a method for generating a unique maneuver ID, other algorithms may be used to generate a unique identification.

In addition or alternatively, in some aspects, the systems and techniques described herein may include one or more processes for maneuver ID collision detection. For example, a first process (e.g., referred to as Process A) can be performed to determine whether a newly received maneuver ID in a maneuver message (e.g., the MSCM) for a particular maneuver session matches a locally generated maneuver ID (e.g., using the hashing-based technique described above) for the particular maneuver session. In some cases, process A can further include verifying that the maneuver ID is generated by a particular source ID (e.g., generated by the vehicle associated with the source ID of the maneuver). In another example, a second process (e.g., Process B) can be performed to verify whether an attacker has spoofed the source ID of the maneuver message (e.g., the MSCM) of the particular maneuver session, such as by comparing source IDs of a plurality of maneuver messages having a common maneuver ID. When a misbehavior has been detected (e.g., for either or both of the processes A and B), the vehicle may generate a misbehavior report containing specific details of the detected misbehavior. The vehicle may transmit the misbehavior report to one or more other vehicles, to a server, or to another entity. If a misbehavior is not detected (e.g., the maneuver IDs match and/or the source IDs match), the vehicle can remain idle by processing the maneuver messages according to a common protocol.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (MC), or a Non-Real Time (Non-RT) MC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3A:
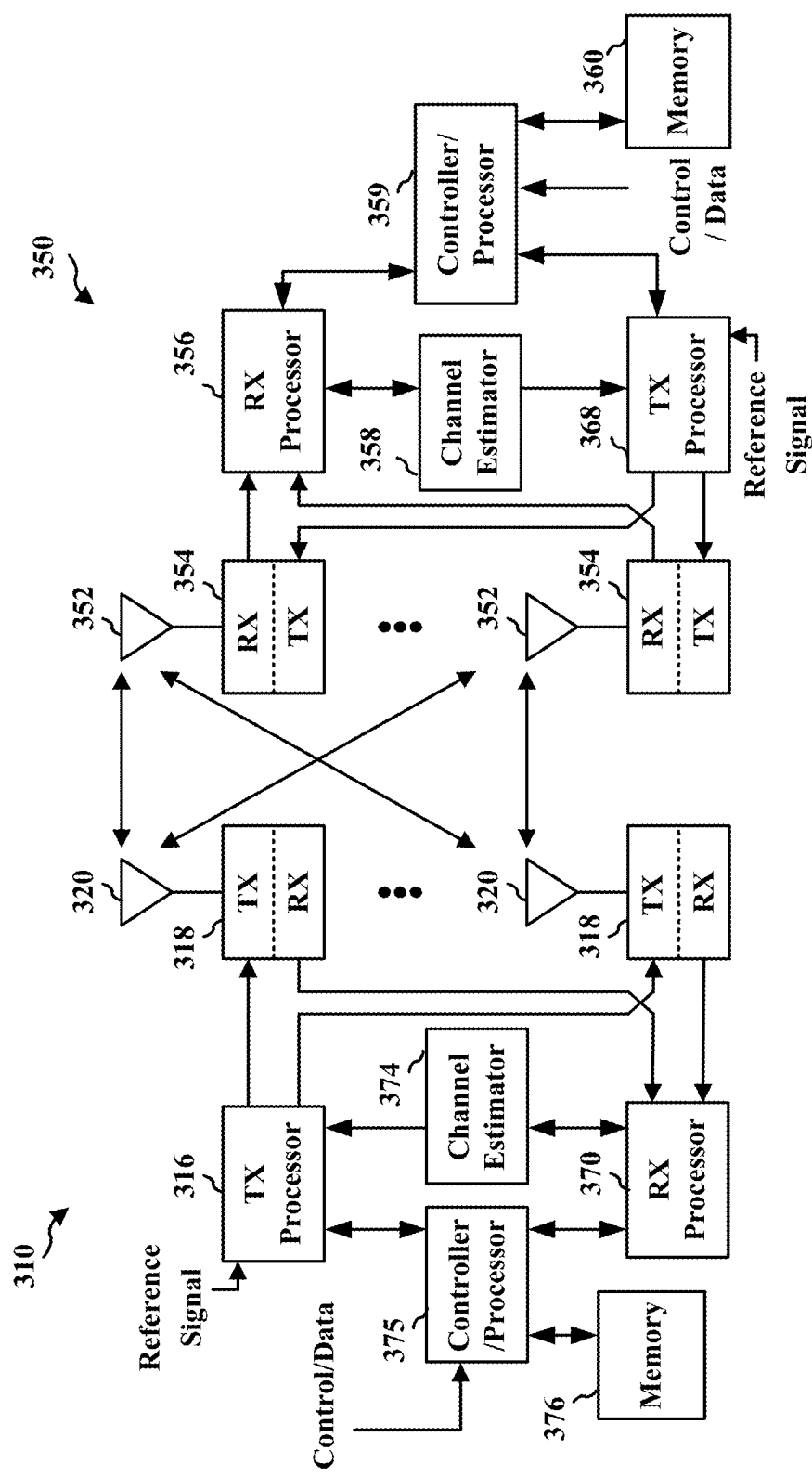
FIG. 3A is a diagram illustrating an example of a first device and a second device involved in wireless communications (e.g., V2V communications, V2X communications, and/or other device-to-device communication), in accordance with some aspects of the present disclosure.

FIG. 3A is a block diagram of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 3B:
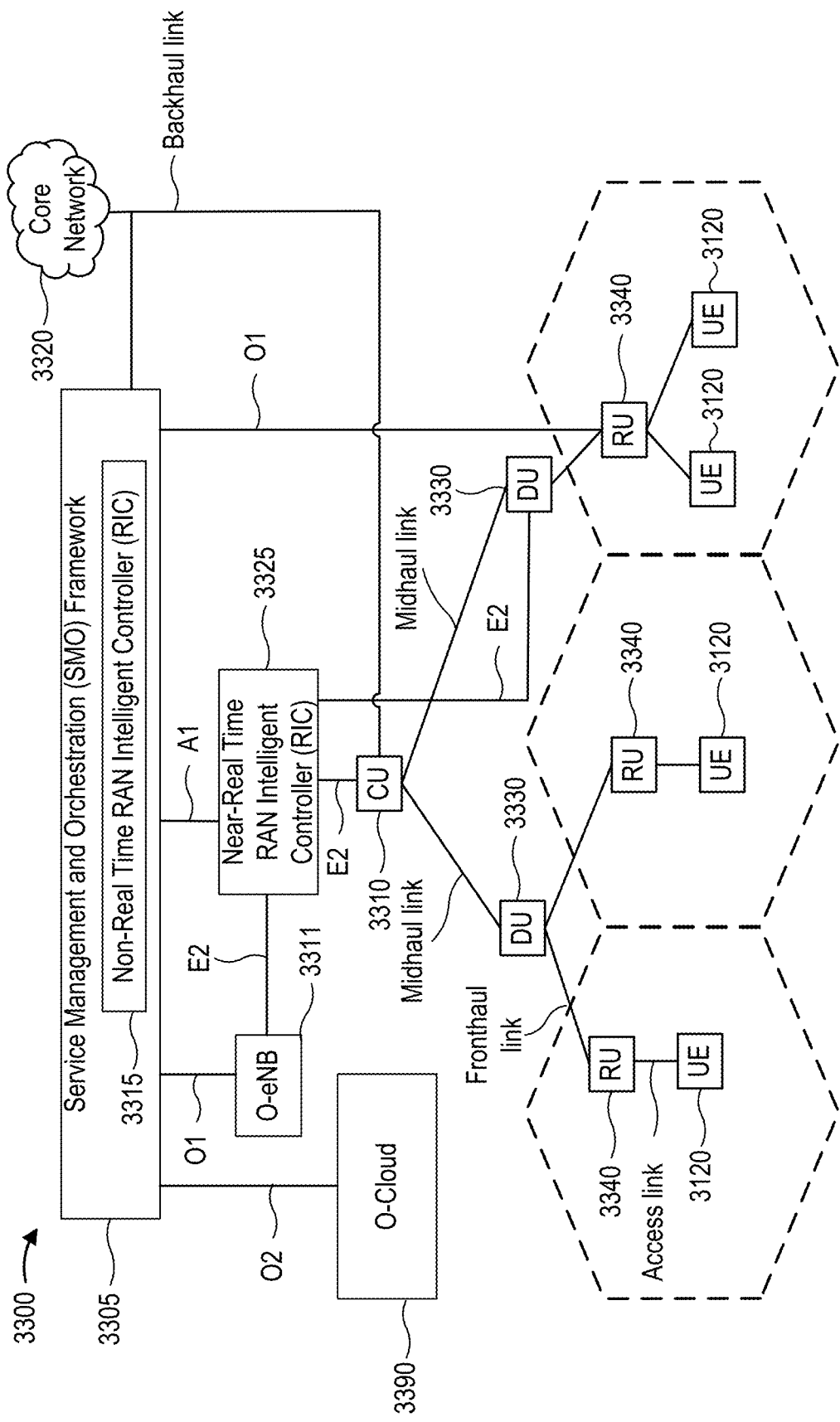
FIG. 3B is a diagram illustrating an example of a disaggregated base station architecture, which may be employed by the disclosed system for securely managing maneuver IDs for communications (e.g., V2X communications), in accordance with some examples.

FIG. 3B is a diagram illustrating an example of a disaggregated base station 3300 architecture, which may be employed by the disclosed system for securely managing maneuver IDs for communications (e.g., V2X communications), in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3B shows a diagram illustrating an example disaggregated base station 3300 architecture. The disaggregated base station 3300 architecture may include one or more central units (CUs) 3310 that can communicate directly with a core network 3320 via a backhaul link, or indirectly with the core network 3320 through one or more disaggregated base station units (such as a Near-Real Time (Near-RT) RAN Intelligent Controller (MC) 3325 via an E2 link, or a Non-Real Time (Non-RT) MC 3315 associated with a Service Management and Orchestration (SMO) Framework 3305, or both). A CU 3310 may communicate with one or more distributed units (DUs) 3330 via respective midhaul links, such as an F1 interface. The DUs 3330 may communicate with one or more radio units (RUs) 3340 via respective fronthaul links. The RUs 3340 may communicate with respective UEs 3120 via one or more RF access links. In some implementations, the UE 3120 may be simultaneously served by multiple RUs 3340.

Each of the units, i.e., the CUs 3310, the DUs 3330, the RUs 3340, as well as the Near-RT RICs 3325, the Non-RT RICs 3315 and the SMO Framework 3305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 3310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 3310. The CU 3310 may be configured to handle user plane functionality (i.e., Central Unit—User Plane (CU-UP)), control plane functionality (i.e., Central Unit—Control Plane (CU-CP)), or a combination thereof. In some implementations, the CU 3310 can be logically split into one or more CU-UP units and one or more CU-CP units. The CU-UP unit can communicate bidirectionally with the CU-CP unit via an interface, such as the E1 interface when implemented in an O-RAN configuration. The CU 3310 can be implemented to communicate with the DU 3330, as necessary, for network control and signaling.

The DU 3330 may correspond to a logical unit that includes one or more base station functions to control the operation of one or more RUs 3340. In some aspects, the DU 3330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 3330 may further host one or more low PHY layers. Each layer (or module) can be implemented with an interface configured to communicate signals with other layers (and modules) hosted by the DU 3330, or with the control functions hosted by the CU 3310.

Lower-layer functionality can be implemented by one or more RUs 3340. In some deployments, an RU 3340, controlled by a DU 3330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 3340 can be implemented to handle over the air (OTA) communication with one or more UEs 3120. In some implementations, real-time and non-real-time aspects of control and user plane communication with the RU(s) 3340 can be controlled by the corresponding DU 3330. In some scenarios, this configuration can enable the DU(s) 3330 and the CU 3310 to be implemented in a cloud-based RAN architecture, such as a vRAN architecture.

The SMO Framework 3305 may be configured to support RAN deployment and provisioning of non-virtualized and virtualized network elements. For non-virtualized network elements, the SMO Framework 3305 may be configured to support the deployment of dedicated physical resources for RAN coverage requirements which may be managed via an operations and maintenance interface (such as an O1 interface). For virtualized network elements, the SMO Framework 3305 may be configured to interact with a cloud computing platform (such as an open cloud (O-Cloud) 3390) to perform network element life cycle management (such as to instantiate virtualized network elements) via a cloud computing platform interface (such as an O2 interface). Such virtualized network elements can include, but are not limited to, CUs 3310, DUs 3330, RUs 3340 and Near-RT RICs 3325. In some implementations, the SMO Framework 3305 can communicate with a hardware aspect of a 4G RAN, such as an open eNB (O-eNB) 3311, via an O1 interface. Additionally, in some implementations, the SMO Framework 3305 can communicate directly with one or more RUs 3340 via an O1 interface. The SMO Framework 3305 also may include a Non-RT RIC 3315 configured to support functionality of the SMO Framework 3305.

The Non-RT RIC 3315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 3325. The Non-RT RIC 3315 may be coupled to or communicate with (such as via an A1 interface) the Near-RT RIC 3325. The Near-RT RIC 3325 may be configured to include a logical function that enables near-real-time control and optimization of RAN elements and resources via data collection and actions over an interface (such as via an E2 interface) connecting one or more CUs 3310, one or more DUs 3330, or both, as well as an O-eNB, with the Near-RT MC 3325.

In some implementations, to generate AI/ML models to be deployed in the Near-RT MC 3325, the Non-RT RIC 3315 may receive parameters or external enrichment information from external servers. Such information may be utilized by the Near-RT RIC 3325 and may be received at the SMO Framework 3305 or the Non-RT RIC 3315 from non-network data sources or from network functions. In some examples, the Non-RT RIC 3315 or the Near-RT MC 3325 may be configured to tune RAN behavior or performance. For example, the Non-RT RIC 3315 may monitor long-term trends and patterns for performance and employ AI/ML models to perform corrective actions through the SMO Framework 3305 (such as reconfiguration via 01) or via creation of RAN management policies (such as A1 policies).

Figure 4:
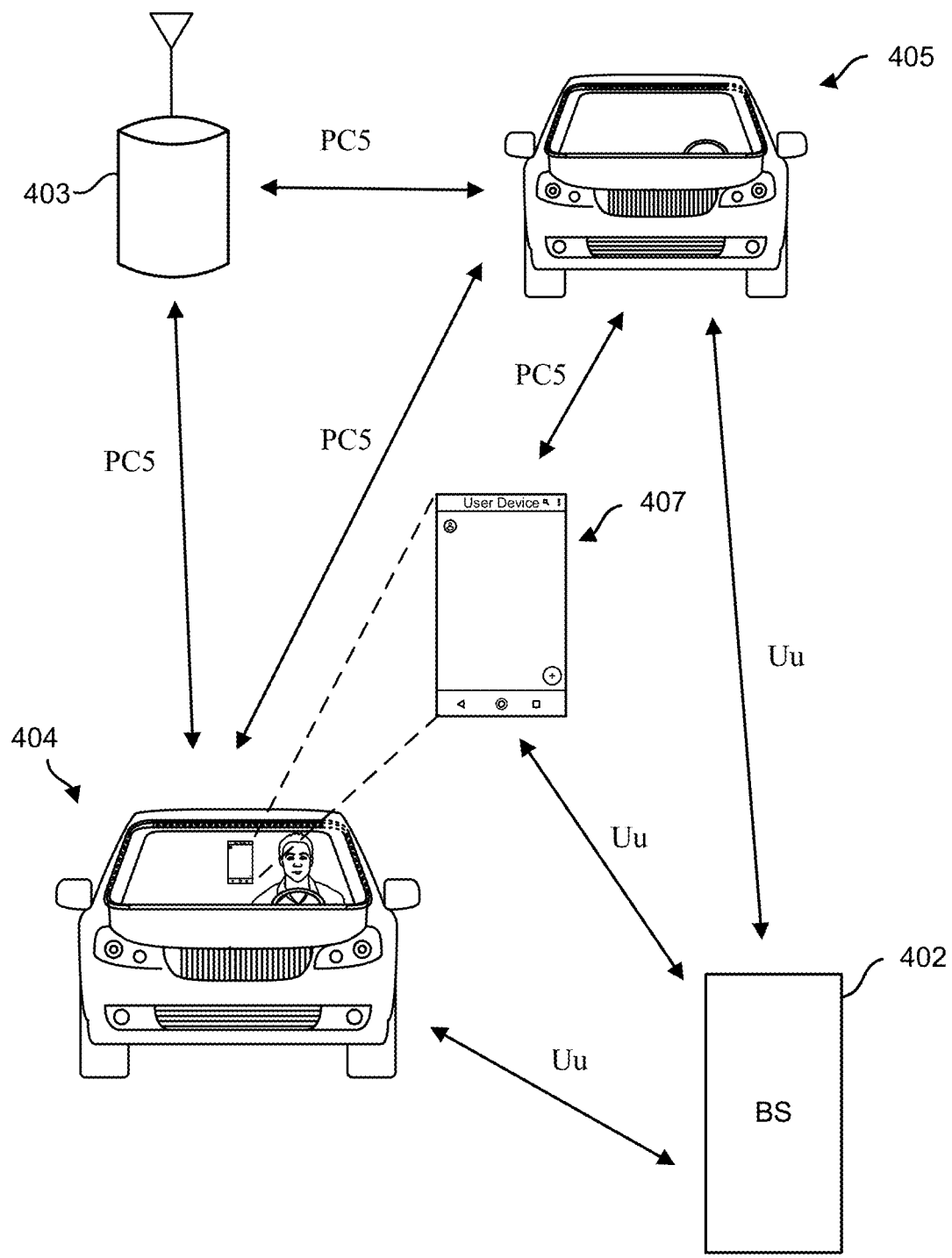
FIG. 4 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, in accordance with some aspects of the present disclosure.

FIG. 4 illustrates examples of different communication mechanisms used by various UEs. In one example of sidelink communications, FIG. 4 illustrates a vehicle 404, a vehicle 405, and an RSU 403 communicating with each other using PC5, DSRC, or other device to device direct signaling interfaces. In addition, the vehicle 404 and the vehicle 405 may communicate with a base station 402 (shown as BS 402) using a network (Uu) interface. The base station 402 can include a gNB in some examples. FIG. 4 also illustrates a user device 407 communicating with the base station 402 using a network (Uu) interface. As described below, functionalities can be transferred from a vehicle (e.g., vehicle 404) to a user device (e.g., user device 407) based on one or more characteristics or factors (e.g., temperature, humidity, etc.). In one illustrative example, V2X functionality can be transitioned from the vehicle 404 to the user device 407, after which the user device 407 can communicate with other vehicles (e.g., vehicle 405) over a PC5 interface (or other device to device direct interface, such as a DSRC interface), as shown in FIG. 4.

While FIG. 4 illustrates a particular number of vehicles (e.g., two vehicles 404 and 405) communicating with each other and/or with RSU 403, BS 402, and/or user device 407, the present disclosure is not limited thereto. For instance, tens or hundreds of such vehicles may be communicating with one another and/or with RSU 403, BS 402, and/or user device 407. At any given point in time, each such vehicle, RSU 403, BS 402, and/or user device 407 may transmit various types of information as messages to other nearby vehicles resulting in each vehicle (e.g., vehicles 404 and/or 405), RSU 403, BS 402, and/or user device 407 receiving hundreds or thousands of messages from other nearby vehicles, RSUs, base stations, and/or other UEs per second.

While PC5 interfaces are shown in FIG. 4, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 5:
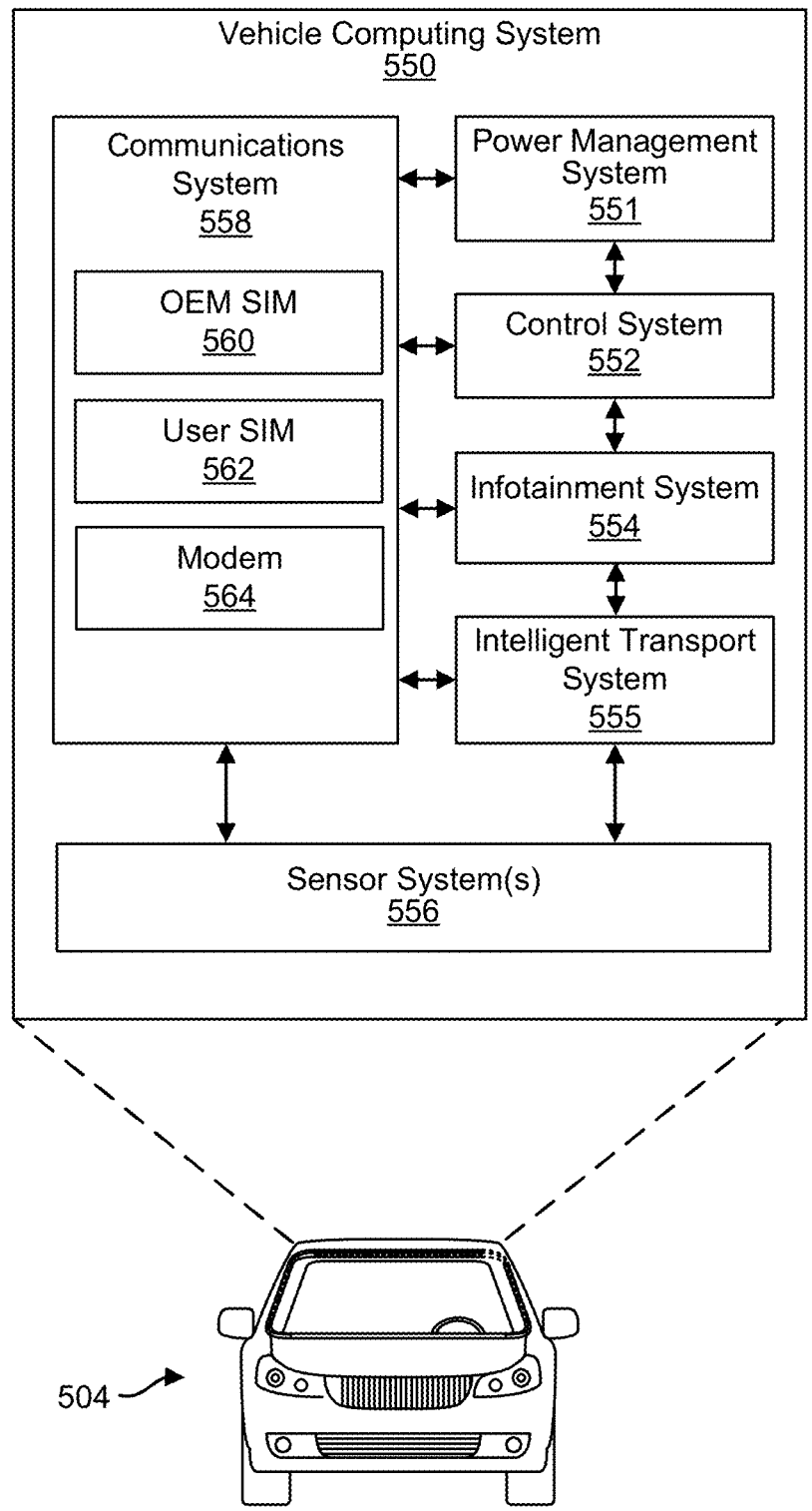
FIG. 5 is a block diagram illustrating an example of a computing system of a vehicle, in accordance with some aspects of the present disclosure.

FIG. 5 is a block diagram illustrating an example a vehicle computing system 550 of a vehicle 504. The vehicle 504 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 550 can include at least a power management system 551, a control system 552, an infotainment system 554, an intelligent transport system (ITS) 555, one or more sensor systems 556, and a communications system 558. In some cases, the vehicle computing system 550 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 552 can be configured to control one or more operations of the vehicle 504, the power management system 551, the computing system 550, the infotainment system 554, the ITS 555, and/or one or more other systems of the vehicle 504 (e.g., a braking system, a steering system, a safety system other than the ITS 555, a cabin system, and/or other system). In some examples, the control system 552 can include one or more electronic control units (ECUs). An ECU can control one or more of the electrical systems or subsystems in a vehicle. Examples of specific ECUs that can be included as part of the control system 552 include an engine control module (ECM), a powertrain control module (PCM), a transmission control module (TCM), a brake control module (BCM), a central control module (CCM), a central timing module (CTM), among others. In some cases, the control system 552 can receive sensor signals from the one or more sensor systems 556 and can communicate with other systems of the vehicle computing system 550 to operate the vehicle 504.

The vehicle computing system 550 also includes a power management system 551. In some implementations, the power management system 551 can include a power management integrated circuit (PMIC), a standby battery, and/or other components. In some cases, other systems of the vehicle computing system 550 can include one or more PMICs, batteries, and/or other components. The power management system 551 can perform power management functions for the vehicle 504, such as managing a power supply for the computing system 550 and/or other parts of the vehicle. For example, the power management system 551 can provide a stable power supply in view of power fluctuations, such as based on starting an engine of the vehicle. In another example, the power management system 551 can perform thermal monitoring operations, such as by checking ambient and/or transistor junction temperatures. In another example, the power management system 551 can perform certain functions based on detecting a certain temperature level, such as causing a cooling system (e.g., one or more fans, an air conditioning system, etc.) to cool certain components of the vehicle computing system 550 (e.g., the control system 552, such as one or more ECUs), shutting down certain functionalities of the vehicle computing system 550 (e.g., limiting the infotainment system 554, such as by shutting off one or more displays, disconnecting from a wireless network, etc.), among other functions.

The vehicle computing system 550 further includes a communications system 558. The communications system 558 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 558 is configured to transmit and receive information wirelessly over any suitable wireless network (e.g., a 3G network, 4G network, 5G network, WiFi network, Bluetooth™ network, and/or other network). The communications system 558 includes various components or devices used to perform the wireless communication functionalities, including an original equipment manufacturer (OEM) subscriber identity module (referred to as a SIM or SIM card) 560, a user SIM 562, and a modem 564. While the vehicle computing system 550 is shown as having two SIMs and one modem, the computing system 550 can have any number of SIMs (e.g., one SIM or more than two SIMS) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 560 can be used by the communications system 558 for establishing a wireless connection for vehicle-based operations, such as for conducting emergency-calling (eCall) functions, communicating with a communications system of the vehicle manufacturer (e.g., for software updates, etc.), among other operations. The OEM SIM 560 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 562 can be used by the communications system 558 for performing wireless network access functions in order to support a user data connection (e.g., for conducting phone calls, messaging, Infotainment related services, among others). In some cases, a user device of a user can connect with the vehicle computing system 550 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 558 the vehicle, in which case the user device can cease performance of the wireless network access functionality (e.g., during the period in which the communications system 558 is performing the wireless access functionality). The communications system 558 can begin interacting with a base station to perform one or more wireless communication operations, such as facilitating a phone call, transmitting and/or receiving data (e.g., messaging, video, audio, etc.), among other operations. In such cases, other components of the vehicle computing system 550 can be used to output data received by the communications system 558. For example, the infotainment system 554 (described below) can display video received by the communications system 558 on one or more displays and/or can output audio received by the communications system 558 using one or more speakers.

A modem is a device that modulates one or more carrier wave signals to encode digital information for transmission, and demodulates signals to decode the transmitted information. The modem 564 (and/or one or more other modems of the communications system 558) can be used for communication of data for the OEM SIM 560 and/or the user SIM 562. In some examples, the modem 564 can include a 4G (or LTE) modem and another modem (not shown) of the communications system 558 can include a 5G (or NR) modem. In some examples, the communications system 558 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 564 (and/or one or more other modems of the communications system 558) can be used for performing V2X communications (e.g., with other vehicles for V2V communications, with other devices for D2D communications, with infrastructure systems for V2I communications, with pedestrian UEs for V2P communications, etc.). In some examples, the communications system 558 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 558 can be or can include a telematics control unit (TCU). In some implementations, the TCU can include a network access device (NAD) (also referred to in some cases as a network control unit or NCU). The NAD can include the modem 564, any other modem not shown in FIG. 5, the OEM SIM 560, the user SIM 562, and/or other components used for wireless communications. In some examples, the communications system 558 can include a Global Navigation Satellite System (GNSS). In some cases, the GNSS can be part of the one or more sensor systems 556, as described below. The GNSS can provide the ability for the vehicle computing system 550 to perform one or more location services, navigation services, and/or other services that can utilize GNSS functionality.

In some cases, the communications system 558 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 504 to communicate with a network and/or other UEs.

The vehicle computing system 550 can also include an infotainment system 554 that can control content and one or more output devices of the vehicle 504 that can be used to output the content. The infotainment system 554 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 504), and/or other output device.

In some examples, the computing system 550 can include the intelligent transport system (ITS) 555. In some examples, the ITS 555 can be used for implementing V2X communications. For example, an ITS stack of the ITS 555 can generate V2X messages based on information from an application layer of the ITS. In some cases, the application layer can determine whether certain conditions have been met for generating messages for use by the ITS 555 and/or for generating messages that are to be sent to other vehicles (for V2V communications), to pedestrian UEs (for V2P communications), and/or to infrastructure systems (for V2I communications). In some cases, the communications system 558 and/or the ITS 555 can obtain car access network (CAN) information (e.g., from other components of the vehicle via a CAN bus). In some examples, the communications system 558 (e.g., a TCU NAD) can obtain the CAN information via the CAN bus and can send the CAN information to a PHY/MAC layer of the ITS 555. The ITS 555 can provide the CAN information to the ITS stack of the ITS 555. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 555.

The conditions used to determine whether to generate messages can be determined using the CAN information based on safety-related applications and/or other applications, including applications related to road safety, traffic efficiency, infotainment, business, and/or other applications. In one illustrative example, the ITS 555 can perform lane change assistance or negotiation. For instance, using the CAN information, the ITS 555 can determine that a driver of the vehicle 504 is attempting to change lanes from a current lane to an adjacent lane (e.g., based on a blinker being activated, based on the user veering or steering into an adjacent lane, etc.). Based on determining the vehicle 504 is attempting to change lanes, the ITS 555 can determine a lane-change condition has been met that is associated with a message to be sent to other vehicles that are nearby the vehicle in the adjacent lane. The ITS 555 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 504, such as based on V2P communications with a UE of the user), traffic sign recognition, among others.

The ITS 555 can use any suitable protocol to generate messages (e.g., V2X messages). Examples of protocols that can be used by the ITS 555 include one or more Society of Automotive Engineering (SAE) standards, such as SAE J2735, SAE J2945, SAE J3161, and/or other standards, which are hereby incorporated by reference in their entirety and for all purposes.

A security layer of the ITS 555 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 555 can be signed by the security layer of the ITS 555. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 555 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 552) to perform automatic functions, such as automatic breaking, automatic steering (e.g., to maintain a heading in a particular lane), automatic lane change negotiation with other vehicles, among other automatic functions. In one illustrative example, a message can be received by the communications system 558 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 552, which can cause the control system 552 to automatically break the vehicle 504 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 555 can receive a large number of messages from the other UEs (e.g., vehicles, RSUs, etc.), in which case the ITS 555 will authenticate (e.g., decode and decrypt) each of the messages and/or determine which operations to perform. Such a large number of messages can lead to a large computational load for the vehicle computing system 550. In some cases, the large computational load can cause a temperature of the computing system 550 to increase. Rising temperatures of the components of the computing system 550 can adversely affect the ability of the computing system 550 to process the large number of incoming messages. One or more functionalities can be transitioned from the vehicle 504 to another device (e.g., a user device, a RSU, etc.) based on a temperature of the vehicle computing system 550 (or component thereof) exceeding or approaching one or more thermal levels. Transitioning the one or more functionalities can reduce the computational load on the vehicle 504, helping to reduce the temperature of the components. A thermal load balancer can be provided that enable the vehicle computing system 550 to perform thermal based load balancing to control a processing load depending on the temperature of the computing system 550 and processing capacity of the vehicle computing system 550.

The computing system 550 further includes one or more sensor systems 556 (e.g., a first sensor system through an Nth sensor system, where N is a value equal to or greater than 0). When including multiple sensor systems, the sensor system(s) 556 can include different types of sensor systems that can be arranged on or in different parts the vehicle 504. The sensor system(s) 556 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 550 of the vehicle 504.

While the vehicle computing system 550 is shown to include certain components and/or systems, one of ordinary skill will appreciate that the vehicle computing system 550 can include more or fewer components than those shown in FIG. 5. For example, the vehicle computing system 550 can also include one or more input devices and one or more output devices (not shown). In some implementations, the vehicle computing system 550 can also include (e.g., as part of or separate from the control system 552, the infotainment system 554, the communications system 558, and/or the sensor system(s) 556) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 6:
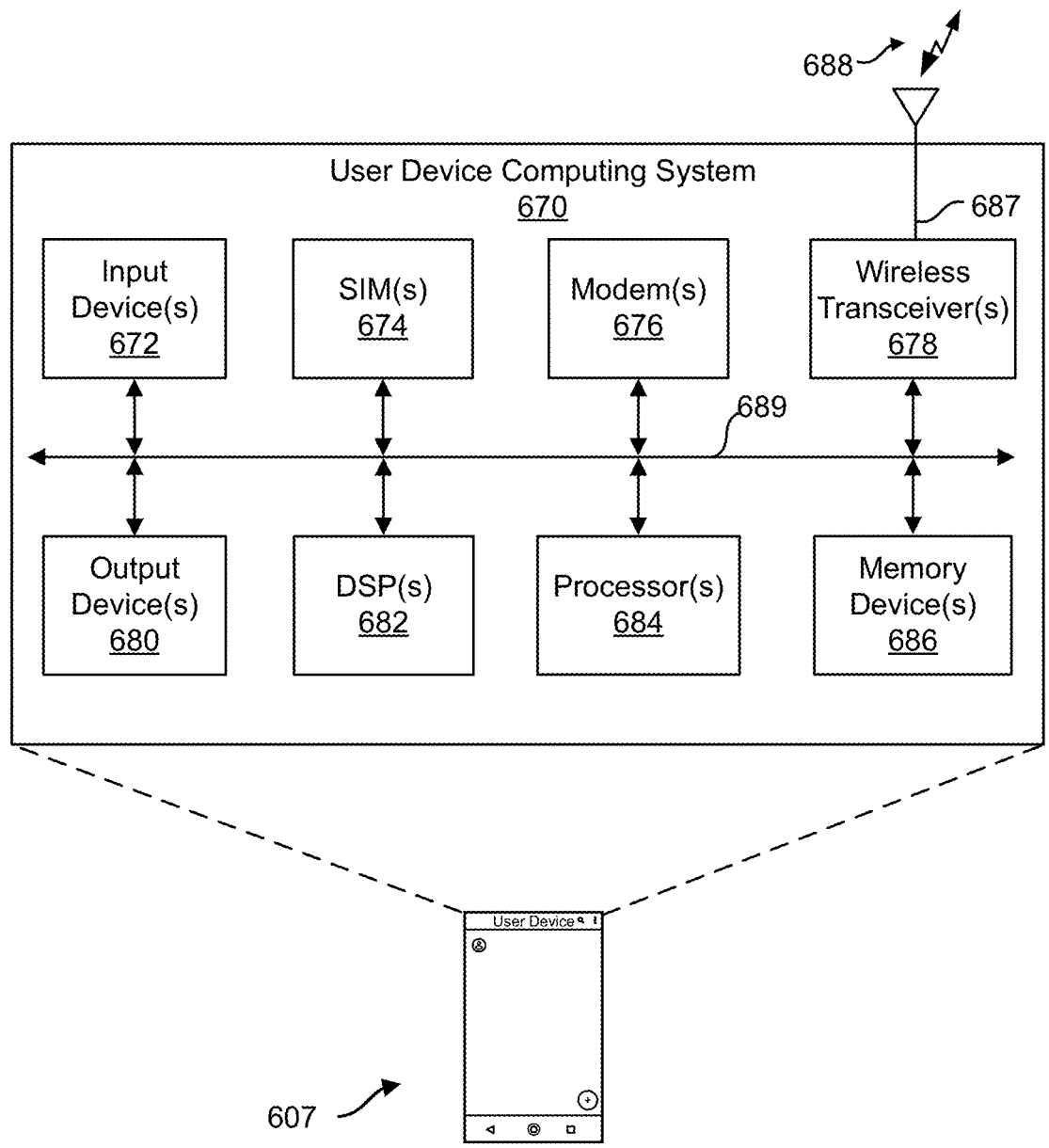
FIG. 6 is a block diagram illustrating an example of a computing system of a user device, in accordance with some aspects of the present disclosure.

FIG. 6 illustrates an example of a computing system 670 of a user device 607. The user device 607 is an example of a UE that can be used by an end-user. For example, the user device 607 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAs, APs, GPUs, VPUs, NSPs, microcontrollers, dedicated hardware, any combination thereof, and/or other processing device or system. The bus 689 can be used by the one or more processors 684 to communicate between cores and/or with the one or more memory devices 686.

The computing system 670 may also include one or more memory devices 686, one or more digital signal processors (DSPs) 682, one or more SIMs 674, one or more modems 676, one or more wireless transceivers 678, an antenna 687, one or more input devices 672 (e.g., a camera, a mouse, a keyboard, a touch sensitive screen, a touch pad, a keypad, a microphone, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, vehicles (e.g., vehicle 504 of FIG. 5 described above), network devices (e.g., base stations such as eNBs and/or gNBs, WiFI routers, etc.), cloud networks, and/or the like. In some examples, the computing system 670 can include multiple antennae. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the AES and/or DES standard) transmitted and/or received by the one or more wireless transceivers 678.

The one or more SIMS 674 can each securely store an IMSI number and related key assigned to the user of the user device 607. As noted above, the IMSI and key can be used to identify and authenticate the subscriber when accessing a network provided by a network service provider or operator associated with the one or more SIMS 674. The one or more modems 676 can modulate one or more signals to encode information for transmission using the one or more wireless transceivers 678. The one or more modems 676 can also demodulate signals received by the one or more wireless transceivers 678 in order to decode the transmitted information. In some examples, the one or more modems 676 can include a 4G (or LTE) modem, a 5G (or NR) modem, a modem configured for V2X communications, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 7:
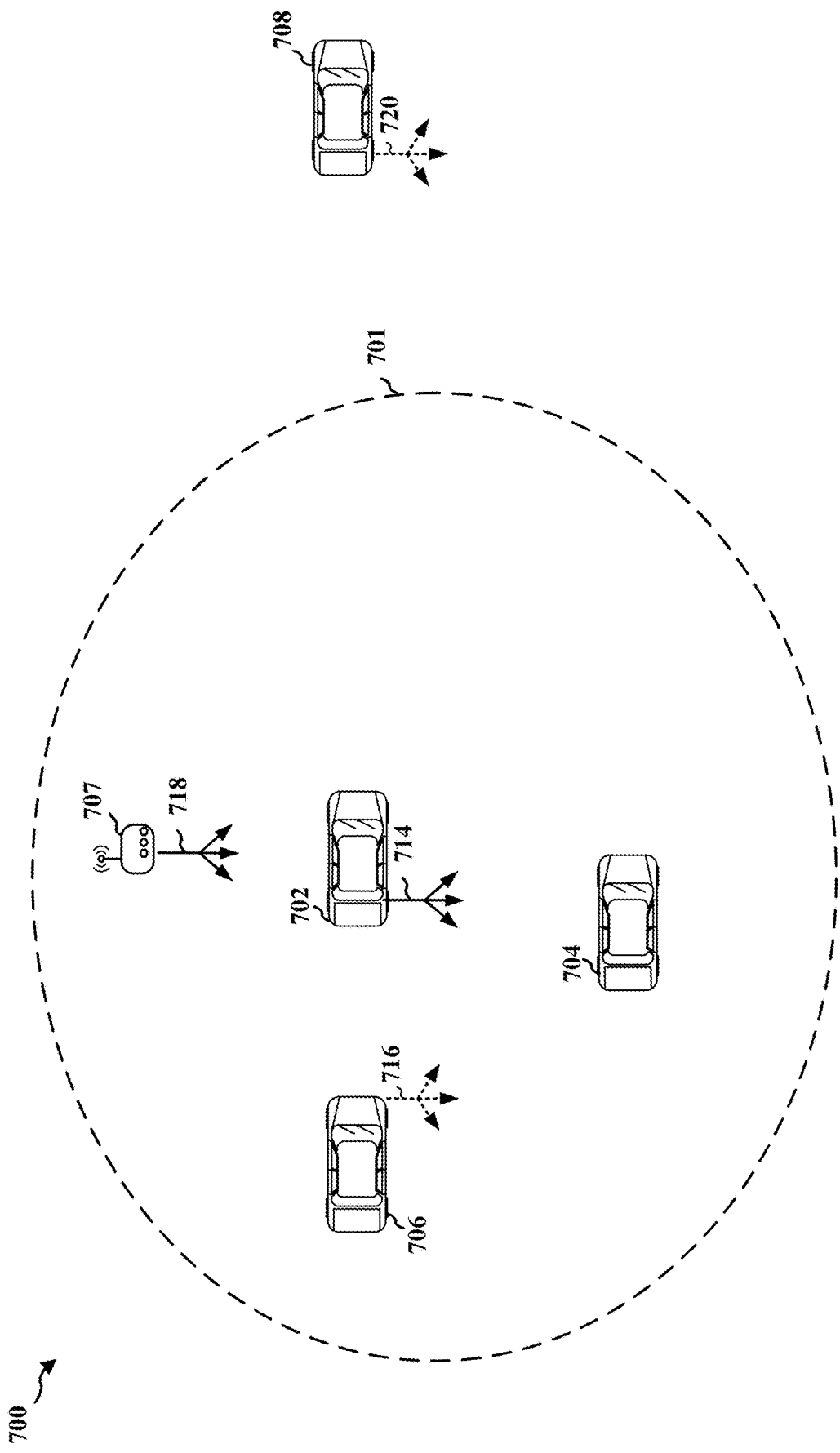
FIG. 7 is a diagram illustrating an example of devices involved in wireless communications (e.g., sidelink communications), in accordance with some aspects of the present disclosure.

FIG. 7 illustrates an example 700 of wireless communication between devices based on sidelink communication, such as V2X or other D2D communication. The communication may be based on a slot structure comprising aspects described in connection with FIG. 2. For example, transmitting UE 702 may transmit a transmission 714, e.g., comprising a control channel and/or a corresponding data channel, that may be received by receiving UEs 704, 706, 708. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 702, 704, 706, 708 may each be capable of operating as a transmitting device in addition to operating as a receiving device. Thus, UEs 706, 708 are illustrated as transmitting transmissions 716, 720. The transmissions 714, 716, 720 (and 718 by RSU 707) may be broadcast or multicast to nearby devices. For example, UE 714 may transmit communication intended for receipt by other UEs within a range 701 of UE 714. Additionally/alternatively, RSU 707 may receive communication from and/or transmit communication 718 to UEs 702, 704, 706, 708.

UE 702, 704, 706, 708 or RSU 707 may comprise a detection component, similar to 198 described in connection with FIG. 1. UE 702, 704, 706, 708 or RSU 707 may also comprise a BSM or mitigation component, similar to 199 described in connection with FIG. 1.

Figure 8A:
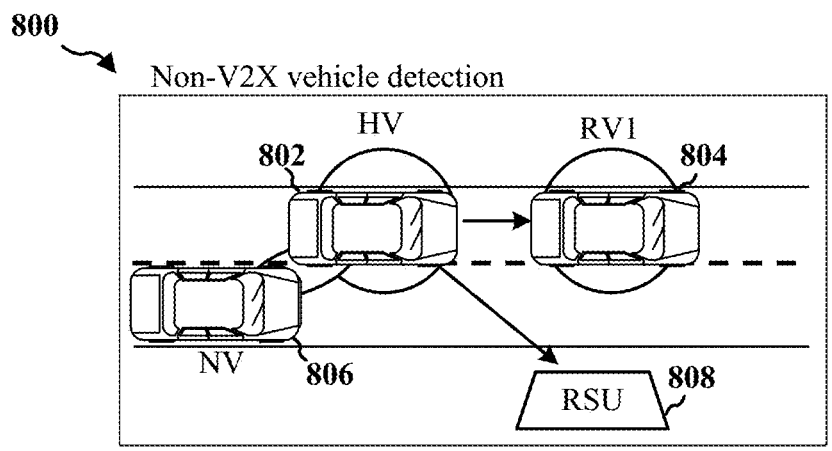
FIGS. 8A-8D are diagrams illustrating examples of sensor-sharing for cooperative and automated driving systems, in accordance with some aspects of the present disclosure.
Figure 8B:
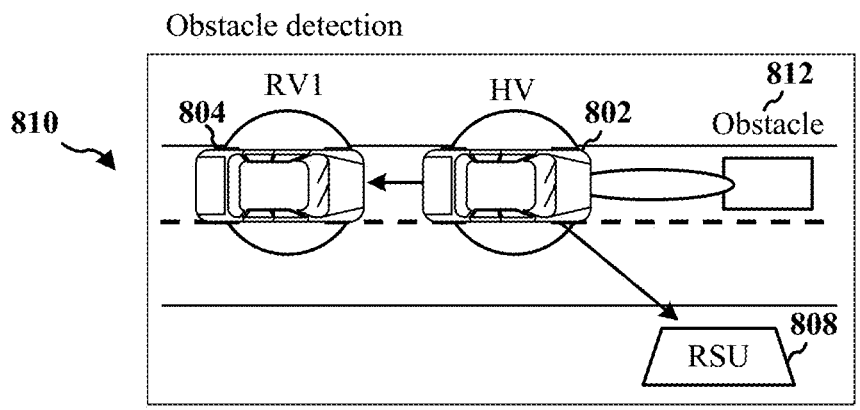
Figure 8C:
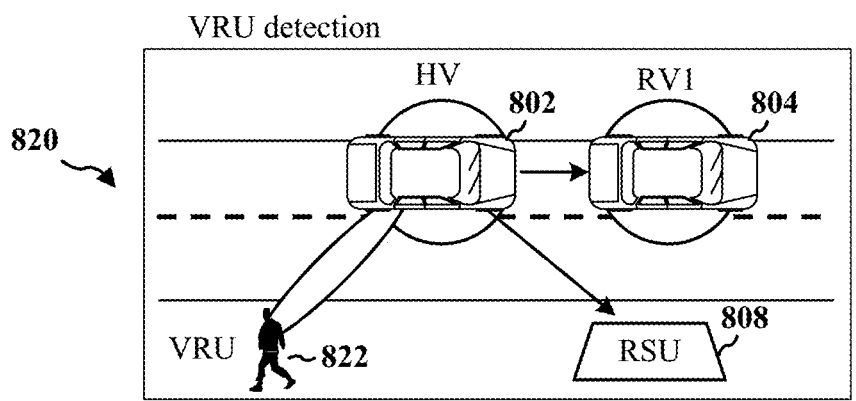
Figure 8D:
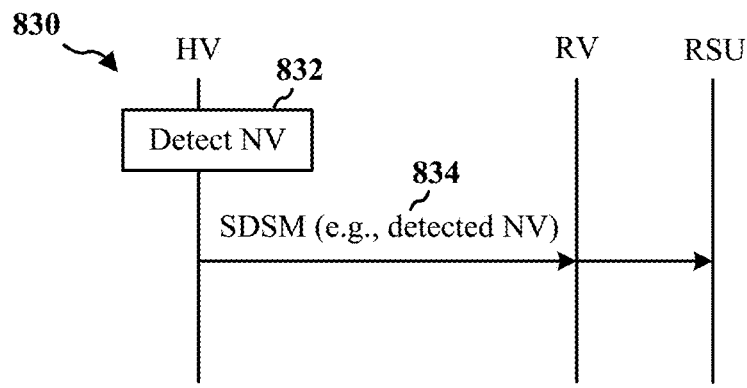
Figure 9:
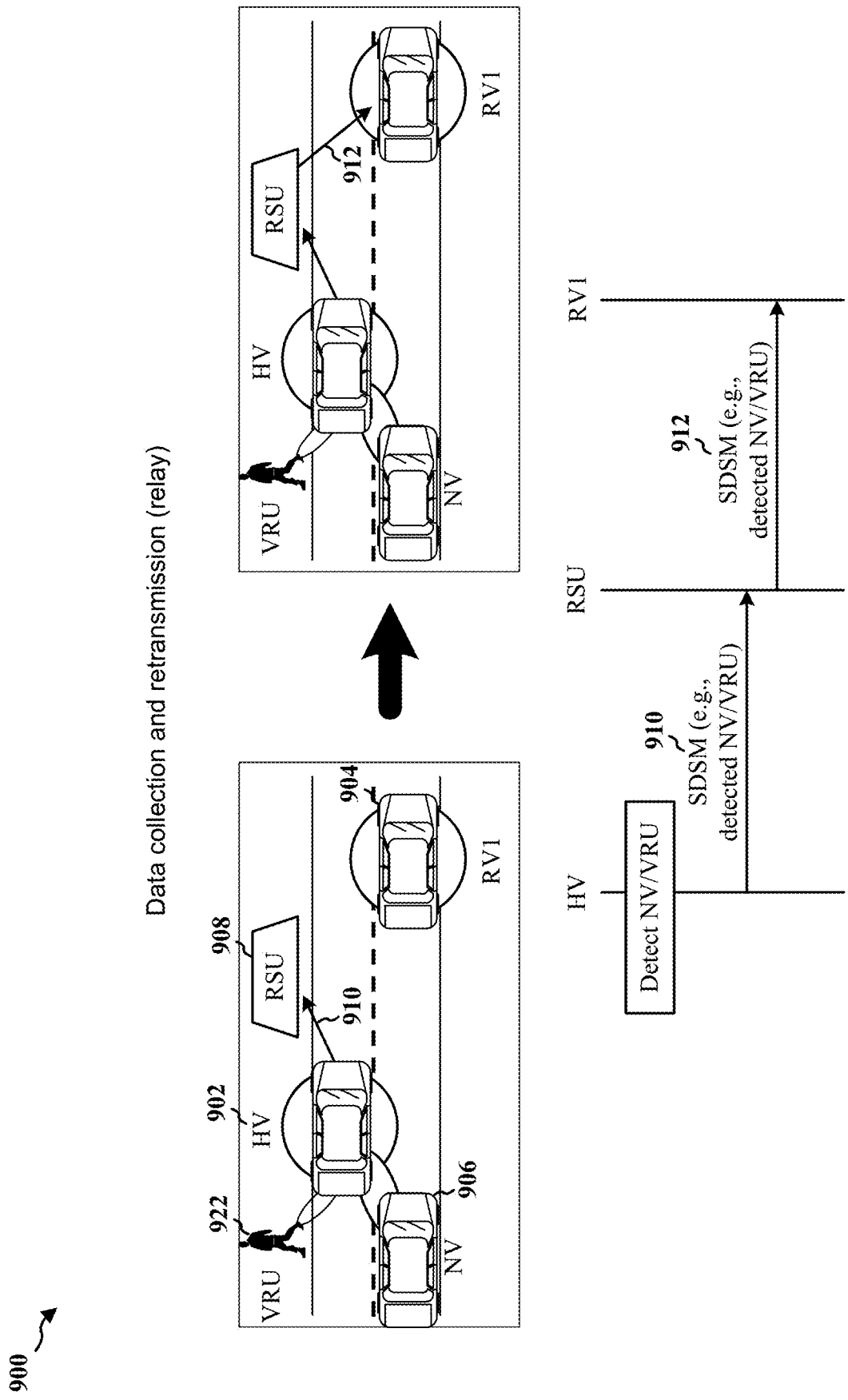
FIG. 9 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 800 of FIG. 8A, the host vehicle (HV) 802 may detect a number of items within its environment. For example, the HV 802 may detect the presence of the non-V2X entity (NV) 806 at block 832. The HV 802 may inform other entities, such as a first remote vehicle (RV1) 804 or a road side unit (RSU) 808, about the presence of the NV 806, if the RV1 804 and/or the RSU 808, by themselves, are unable to detect the NV 806. The HV 802 informing the RV1 804 and/or the RSU 808 about the NV 806 is a sharing of sensor information. With reference to diagram 810 of FIG. 8B, the HV 802 may detect a physical obstacle 812, such as a pothole, debris, or an object that may be an obstruction in the path of the HV 802 and/or RV1 804 that has not yet been detected by RV1 804 and/or RSU 808. The HV 802 may inform the RV1 and/or the RSU 808 of the obstacle 812, such that the obstacle 812 may be avoided. With reference to diagram 820 of FIG. 8C, the HV 802 may detect the presence of a vulnerable road user (VRU) 822 and may share the detection of the VRU 822 with the RV1 804 and the RSU 808, in instances where the RSU 808 and/or RV1 804 may not be able to detect the VRU 822. With reference to diagram 830 of FIG. 8D, the HV, upon detection of a nearby entity (e.g., NV, VRU, obstacle) may transmit a sensor data sharing message (SDSM) 834 to the RV and/or the RSU to share the detection of the entity. The SDSM 834 may be a broadcast message such that any receiving device within the vicinity of the HV may receive the message. In some instances, the shared information may be relayed to other entities, such as RVs. For example, with reference to diagram 900 of FIG. 9, the HV 902 may detect the presence of the NV 906 and/or the VRU 922. The HV 902 may broadcast the SDSM 910 to the RSU 908 to report the detection of NV 906 and/or VRU 922. The RSU 908 may relay the SDSM 910 received from the HV 902 to remote vehicles such that the remote vehicles are aware of the presence of the NV 906 and/or VRU 922. For example, the RSU 908 may transmit an SDSM 912 to the RV1 904, where the SDSM 912 includes information related to the detection of NV 906 and/or VRU 922.

As previously mentioned, a maneuver sharing coordination message (MSCM) is a V2X message that can be used for the exchange of planned trajectories amongst vehicles for performing driving coordination. The MSCM (e.g., MSCM 1400 of FIG. 14) allows for the vehicles to share their maneuver intents to coordinate their planned maneuvers for safer and more efficient driving. A series of MSCMs transmitted amongst vehicles may be utilized for the coordination and performance of a maneuver. The series of MSCMs may consist of a handshaking session between the vehicles impacted by the intended maneuver. The use of MSCMs relies on the exchange of MSCMs and a communication protocol, such as a basic protocol (e.g., basic protocol 1500 of FIG. 15) and emergency protocol (e.g., emergency protocol 1600 of FIG. 16). FIGS. 10, 11, 12A, and 12B show example vehicle configurations 1000, 1100, 1200, 1210 for maneuvers for various different scenarios (e.g., overtaking, merging, and lane change scenarios) that may utilize MSCMs for vehicle coordination of the maneuvers.

It should also be noted that each MSCM of the series of MSCMs utilized to coordinate a maneuver (e.g., an overtake maneuver, a merging maneuver, or a lane change maneuver) may have a specific type (e.g., MSCM Type 1408 of FIG. 14), which can indicate the type of MSCM. Specific types of MSCMs may include, but are not limited to, an intent maneuver message, a request maneuver message, a response maneuver message, a reservation maneuver message, an HV cancellation maneuver message, an RV cancelation maneuver message, and an execution status maneuver message. An example basic protocol 1500 for MSCMs depicted in FIG. 15 shows some example types of MSCMs. For example, in FIG. 15, the MCSM message types for an example basic protocol 1500 are shown to include a maneuver intent (e.g., MSCM type zero) 1510, a maneuver request (e.g., MSCM type one) 1511, a maneuver response (e.g., MSCM type two) 1512, a maneuver reservation (e.g., MSCM type three) 1513, a Host Vehicle (HV) maneuver cancellation (e.g., MSCM type four) 1514, a Remote Vehicle (RV) maneuver cancellation (e.g., MSCM type five) 1515, and a maneuver execution status (e.g., MSCM type seven) 1517.

MSCMs of intent (e.g., MSCM type zero) may be broadcasted at a specific power level to allow for a specific range of transmission such that the vehicles impacted by the intended maneuver may receive the MSCMs and that other vehicles do not receive the MSCMs. Alternatively, the MSCMs of intent (e.g., MSCM type zero) may be broadcasted at a maximum power level to allow for a maximum allowable range of transmission such that all vehicles located within that maximum allowable range of transmission can receive the MSCMs. In response to receiving the MSCMs of intent, the MSCMs of response (e.g., MSCM type two) may be broadcasted only (e.g., unicast) to the specific vehicle that sent the MSMCs of intent (e.g., MSCM type zero).

It should be noted that a series of MSCMs utilized for a maneuver (e.g., an overtake maneuver, a merging maneuver, or a lane change maneuver) may have a single maneuver ID (e.g., Maneuver ID 1414 of FIG. 14) assigned to the MSCMs. A maneuver ID is similar to a Session ID, and is utilized to identify the particular maneuver (e.g., an overtake maneuver, a merging maneuver, or a lane change maneuver) that the series of MSCMs are related and allows for vehicles to track updates for that specific maneuver. As previously mentioned, the maneuver IDs should be unique so as to avoid any possible maneuver ID collisions (e.g., occurring when two or more maneuvers have the same maneuver ID), which can lead to the cancelation of the maneuvers.

Currently, there are no available solutions for generating unique maneuver IDs or for detecting attacks relating to colliding maneuver IDs, which can lead to multiple maneuver cancellations. The disclosed system and techniques provide a unique maneuver ID for each maneuver (e.g., process 1700 of FIG. 17) and provide misbehavior detection and reporting (MBDS) for maneuver ID collision (e.g., process 1800 of FIG. 18).

Figure 10:
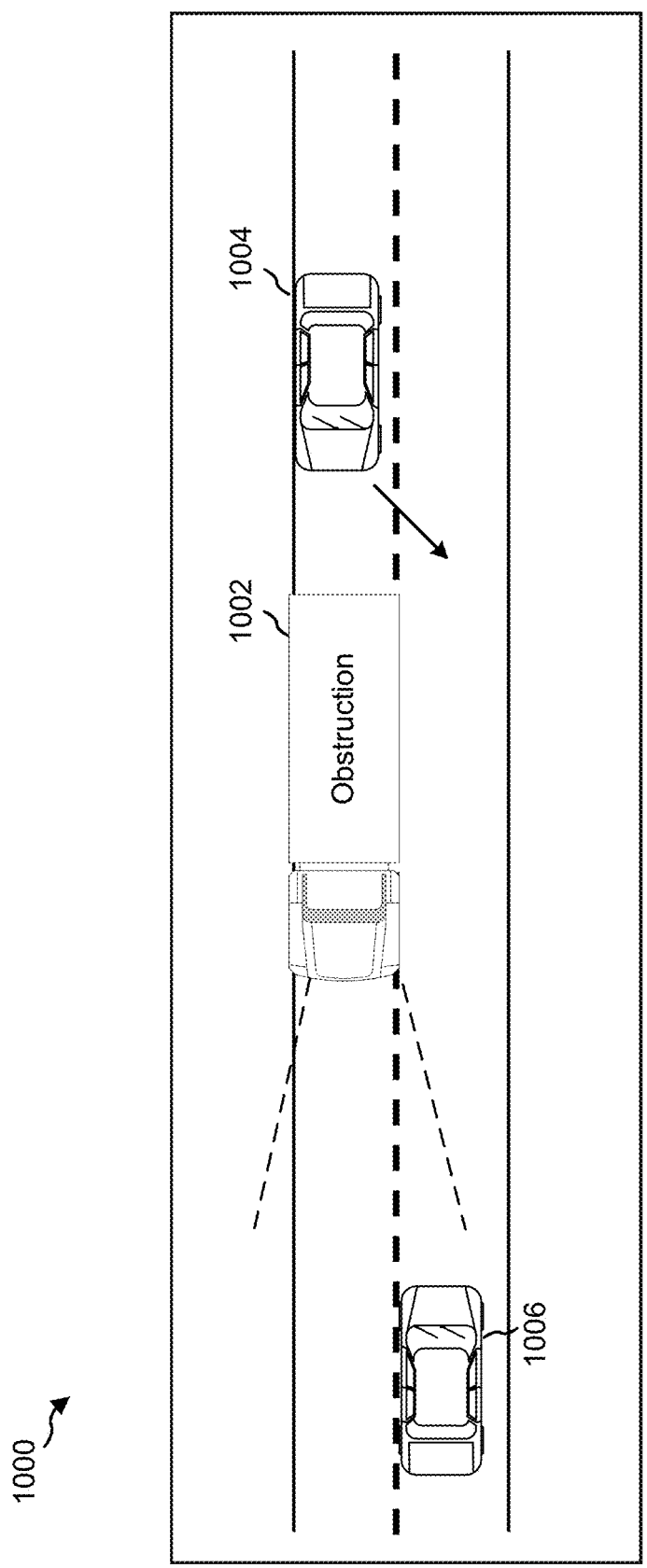
FIG. 10 is a diagram illustrating an example of a vehicle configuration for a vehicle maneuver for a takeover scenario, in accordance with some aspects of the present disclosure.

FIG. 10 is a diagram illustrating an example of a vehicle configuration 1000 for a vehicle maneuver for a takeover scenario. In FIG. 10, the vehicle configuration 1000 is shown to include a plurality of equipped (e.g., V2X capable) network devices. The plurality of equipped network devices includes vehicles (e.g., automobiles) 1004, 1006 and vehicle (e.g., truck) 1002. The vehicle configuration 1000 may comprise more or less equipped network devices, than as shown in FIG. 10. In addition, the vehicle configuration 1000 may comprise non-equipped network devices (not shown in FIG. 10), such as non-equipped vehicles, vulnerable road users (VRUs), such as cyclists, and pedestrians. In addition, the vehicle configuration 1000 may comprise more or less different types of equipped network devices (e.g., which may include equipped UEs), than as shown in FIG. 10. In addition, in one or more examples, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices may be capable of performing V2X communications. In addition, at least some of the equipped network devices are capable of transmitting and receiving sensing signals for radar (e.g., RF sensing signals) and/or LIDAR (e.g., optical sensing signals) to detect nearby vehicles and/or objects. In one or more examples, vehicles 1002, 1004, 1006 may be capable of transmitting and receiving sensing signals of some kind (e.g., camera, radar, and/or LIDAR sensing signals).

In some examples, some of the equipped network devices 1002, 1004, 1006 may have higher capability sensors (e.g., GPS receivers, cameras, RF antennas, and/or optical lasers and/or optical sensors) than other equipped network devices of the vehicle configuration 1000. For example, vehicle (e.g., truck) 1002 may have more expensive, higher capability sensors than the other vehicles (e.g., automobiles) 1006, 1004. In one illustrative example, vehicle 1002 may have one or more higher capability LIDAR sensors (e.g., high capability optical lasers and optical sensors) than the other equipped network devices in the vehicle configuration 1000. For instance, the LIDAR of vehicle 1002 may be able to detect a VRU (e.g., cyclist) and/or a pedestrian with a large degree of confidence (e.g., a seventy percent degree of confidence). In another example, vehicle 1002 may have higher capability radar (e.g., high capability RF antennas) than the other equipped network devices in the vehicle configuration 1000. For instance, the radar of vehicle 1002 may be able to detect a VRU and/or pedestrian with a degree of confidence (e.g., an eight-five percent degree of confidence).

During operation, the equipped network devices (e.g., vehicles 1002, 1004, 1006) may transmit and/or receive sensing signals (e.g., RF and/or optical signals) to sense and detect vehicles (e.g., vehicles 1002, 1004, 1006) and/or objects (not shown) located within and surrounding the road. The equipped network devices (e.g., vehicles 1002, 1004, 1006) may then use the sensing signals to determine characteristics (e.g., motion, dimensions, type, heading, and speed) of the detected vehicles and/or objects. The equipped network devices (e.g., vehicles 1002, 1004, 1006) may generate at least one vehicle-based message (e.g., a C-V2X message, such as a Sensor Data Sharing Message (SDSM), a Basic Safety Message (BSM), a Cooperative Awareness Message (CAM), a Collective Perception Messages (CPM), and/or other type of message) including information related to the determined characteristics of the detected vehicles and/or objects.

The vehicle-based message may include information related to the detected vehicle or object (e.g., a position of the vehicle or object, an accuracy of the position, a speed of the vehicle or object, a direction in which the vehicle or object is traveling, and/or other information related to the vehicle or object), traffic conditions (e.g., low speed and/or dense traffic, high speed traffic, information related to an accident, etc.), weather conditions (e.g., rain, snow, etc.), message type (e.g., an emergency message, a non-emergency or "regular" message, etc.), road topology (line-of-sight (LOS) or non-LOS (NLOS), etc.), any combination, thereof, and/or other information. In some examples, the vehicle-based message may also include information regarding the equipped network device's preference to receive vehicle-based messages from other certain equipped network devices. In some cases, the vehicle-based message may include the current capabilities of the equipped network device (e.g., vehicles 1002, 1004, 1006), such as the equipped network device's sensing capabilities (which can affect the equipped network device's accuracy in sensing vehicles and/or objects), processing capabilities, the equipped network device's thermal status (which can affect the vehicle's ability to process data), and the equipped network device's state of health.

In some aspects, the vehicle-based message may include a dynamic neighbor list (also referred to as a Local Dynamic Map (LDM) or a dynamic surrounding map) for each of the equipped network devices (e.g., vehicles 1002, 1004, 1006). For example, each dynamic neighbor list can include a listing of all of the vehicles and/or objects that are located within a specific predetermined distance (or radius of distance) away from a corresponding equipped network device. In some cases, each dynamic neighbor list includes a mapping, which may include roads and terrain topology, of all of the vehicles and/or objects that are located within a specific predetermined distance (or radius of distance) away from a corresponding equipped network device.

In some implementations, the vehicle-based message may include a specific use case or safety warning, such as a do-not-pass warning (DNPW) or a forward collision warning (FCW), related to the current conditions of the equipped network device (e.g., vehicles 1002, 1004, 1006). In some examples, the vehicle-based message may be in the form of a standard BSM, a CAM, a CPM, a SDSM (e.g., a SAE J3224 SDSM), and/or other format.

In FIG. 10, the vehicle configuration 1000 depicts an example of a takeover scenario where vehicle 1004 wants to overtake (pass) vehicle (e.g., truck) 1002. In particular, in FIG. 10, vehicle 1004 is shown to be driving behind vehicle (e.g., truck) 1002, and vehicle 1006 is driving in the opposite lane and in the opposite direction of vehicles 1002, 1004. Vehicle 1004 (or driver of the vehicle) desires to pass (overtake) the vehicle (e.g., truck) 1002. As such, vehicle 1004 (or driver of the vehicle) desires to perform an overtake maneuver to pass vehicle 1002. In doing so, in one or more examples, vehicle 1004 may utilize a series of MSCMs (e.g., MSCM 1400 of FIG. 14) to coordinate the overtake maneuver with the other vehicles 1002, 1006.

During operation of employing MSCMs for the performance of the overtake maneuver of FIG. 10, vehicle 1004 may transmit an intent maneuver message (e.g., MSCM type zero) and a request maneuver message (e.g. MSCM type one) to the other vehicles 1002, 1006 to notify the other vehicles 1002, 1006 of the vehicle's 1004 intent and desire to overtake vehicle (e.g., truck) 1002. In response, the vehicles 1002, 1006 may transmit a response maneuver message (e.g., MSCM type two) to vehicle 1004 to indicate to vehicle 1004 that they acknowledge and accept the vehicle's 1004 intent and request, and will assist vehicle 1004 with the requested overtake maneuver.

After receiving the response maneuver message (e.g., MSCM type two) from vehicles 1002, 1006, the vehicle 1004 may transmit a reservation maneuver message (e.g., MSCM type three) to the vehicles 1002, 1006 to confirm that the vehicle 1004 has received their response maneuver messages and plans to proceed with the overtake maneuver. Then, the vehicle 1004 may proceed to perform the overtake maneuver and transmit an execute status maneuver message (e.g., MSCM type seven) to vehicles 1002, 1006 to notify the vehicles 1002, 1006 of the status of the performance by vehicle 1004 of the overtake maneuver. It should be noted that this is merely one example of a series of MSCMs that may be utilized by the vehicle 1004 to coordinate the maneuver, and that in other examples, more or less and/or other MSCMs may be employed for executing a maneuver.

Figure 11:
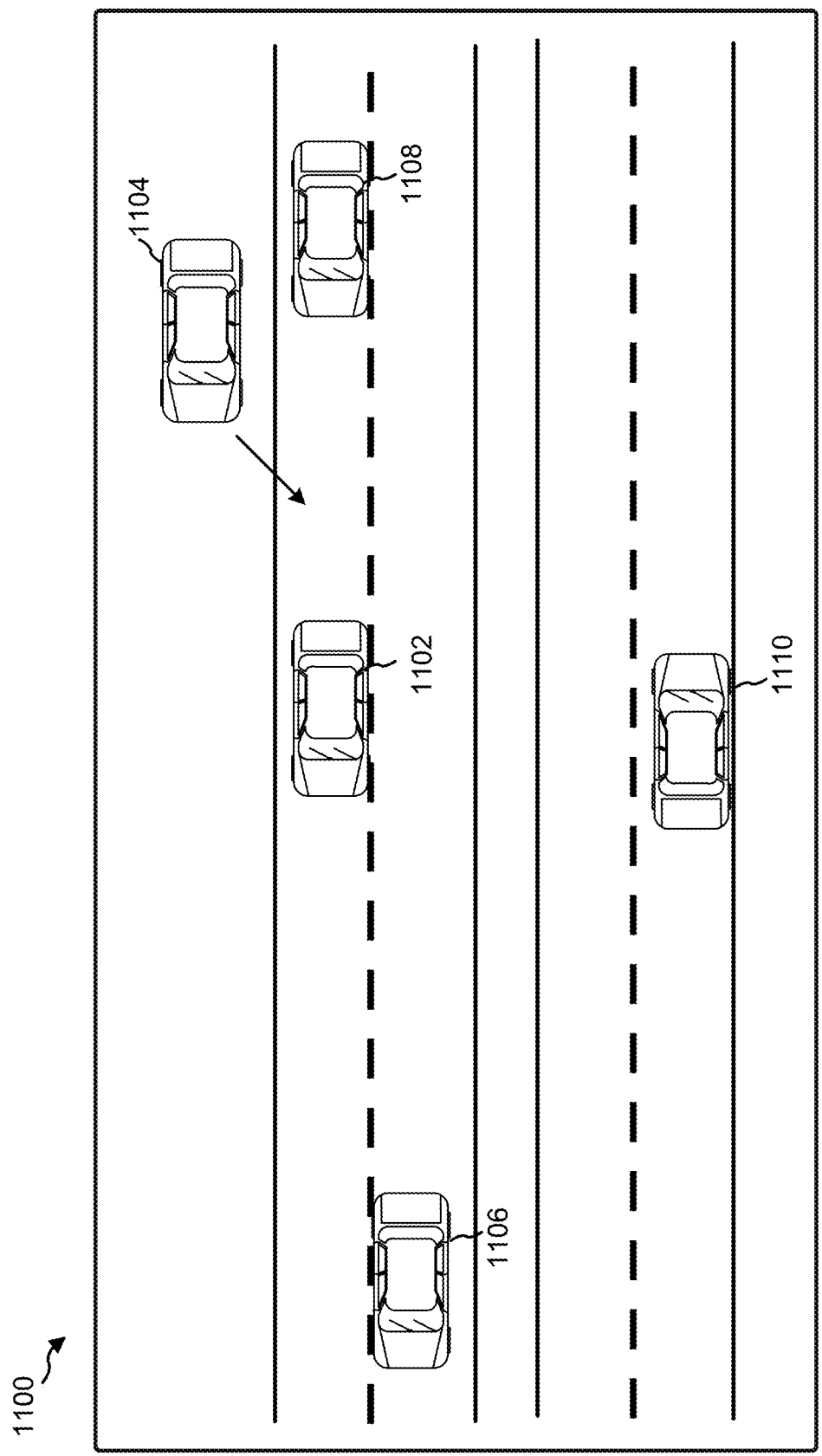
FIG. 11 is a diagram illustrating an example of a vehicle configuration for a vehicle maneuver for a merging scenario, in accordance with some aspects of the present disclosure.

FIG. 11 is a diagram illustrating an example of a vehicle configuration 1100 for a vehicle maneuver for a merging scenario. In FIG. 11, the vehicle configuration 1100 is shown to include a plurality of equipped (e.g., V2X capable) network devices. The plurality of equipped network devices includes vehicles (e.g., automobiles) 1102, 1104, 1106, 1108, 1110. In one or more examples, the vehicle configuration 1100 may comprise more or less equipped network devices, than as shown in FIG. 11. In addition, the vehicle configuration 1100 may comprise non-equipped network devices (not shown in FIG. 11), such as non-equipped vehicles, VRUs, and pedestrians. In one or more examples, the vehicle configuration 1100 may comprise more different types of equipped network devices (e.g., which may include equipped UEs and/or trucks), than as shown in FIG. 11. In addition, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices (e.g., vehicles 1102, 1104, 1106, 1108, 1110) may be capable of performing V2X communications. At least some of the equipped network devices are capable of transmitting and receiving sensing signals for radar (e.g., RF sensing signals) and/or LIDAR (e.g., optical sensing signals) to detect nearby vehicles and/or objects. In one or more examples, vehicles 1102, 1104, 1106, 1108, 1110 may be capable of transmitting and receiving sensing signals of some kind (e.g., camera, radar, and/or LIDAR sensing signals). In some examples, some of the equipped network devices (e.g., vehicles 1102, 1104, 1106, 1108, 1110) may have higher capability sensors (e.g., GPS receivers, cameras, RF antennas, and/or optical lasers and/or optical sensors) than other equipped network devices (e.g., vehicles 1102, 1104, 1106, 1108, 1110) of the vehicle configuration 1100.

During operation, the equipped network devices (e.g., vehicles 1102, 1104, 1106, 1108, 1110) may transmit and/or receive sensing signals (e.g., RF and/or optical signals) to sense and detect vehicles (e.g., vehicles 1102, 1104, 1106, 1108, 1110) and/or objects (not shown in FIG. 11) located within and surrounding the road. The equipped network devices (e.g., vehicles 1102, 1104, 1106, 1108, 1110) may utilize the sensing signals to determine characteristics (e.g., motion, dimensions, type, heading, and speed) of the detected vehicles and/or objects.

The equipped network devices (e.g., vehicles 1102, 1104, 1106, 1108, 1110) may generate at least one vehicle-based message (e.g., a SDSM, a BSM, a CAM, a CPM) including information related to the characteristics of the detected vehicles and/or objects. In one or more examples, the vehicle-based message may include a specific use case or safety warning, such as a DNPW or an FCW, related to the current conditions and environment of the equipped network device (e.g., vehicles 1102, 1104, 1106, 1108, 1110). In some examples, the vehicle-based message may be in the form of a standard BSM, a CAM, a CPM, a SDSM (e.g., SAE J3224 SDSM), and/or other format.

In FIG. 11, the vehicle configuration 1100 depicts an example of a merging scenario where vehicle 1104 wants to merge onto the freeway. In particular, in FIG. 11, vehicles 1106, 1102, and 1108 are shown to be driving in the same direction on the freeway. Vehicle 1110 is shown to be driving on the opposite side of the freeway and in the opposite direction of vehicles 1106, 1102, and 1108. Also in FIG. 11, vehicle 1108 is shown to be driving behind vehicle 1102. Vehicle 1104 desires to merge onto the freeway into a space located in between vehicle 1102 and vehicle 1108. As such, vehicle 1104 (or driver of the vehicle) desires to perform a merging maneuver to merge onto the freeway into a space located in between vehicles 1102 and 1108. In one or more examples, vehicle 1104 may use a series of MSCMs to coordinate the merging maneuver with vehicles 1102, 1108.

During operation of employing MSCMs for the performance of the merging maneuver of FIG. 11, vehicle 1104 may transmit an intent maneuver message (e.g., MSCM type zero) and a request maneuver message (e.g. MSCM type one) to vehicles 1102, 1108 to notify vehicles 1002, 1108 of the vehicle's 1104 intent and desire to merge onto the freeway in a location between vehicles 1102 and 1108. In response, the vehicles 1102, 1108 may transmit a response maneuver message (e.g., MSCM type two) to vehicle 1104 to indicate to vehicle 1104 that they acknowledge and accept the vehicle's 1104 intent and request to merge onto the freeway, and will assist vehicle 1104 with the requested merging maneuver.

After receiving the response maneuver message (e.g., MSCM type two) from vehicles 1102, 1108, vehicle 1104 may transmit a reservation maneuver message (e.g., MSCM type three) to the vehicles 1102, 1108 to confirm that the vehicle 1104 has received their response maneuver messages and plans to perform the merging maneuver to merge onto the freeway. Vehicle 1104 may then proceed to perform the merging maneuver and transmit an execute status maneuver message (e.g., MSCM type seven) to vehicles 1102, 1108 to notify the vehicles 1102, 1108 of the status of the performance by vehicle 1104 of the merging maneuver. It should be noted that this is one example of a series of MSCMs that may be utilized by the vehicle 1104 to coordinate the merging maneuver, and that more or less and/or other MSCMs may be employed for executing the maneuver.

Figure 12A:
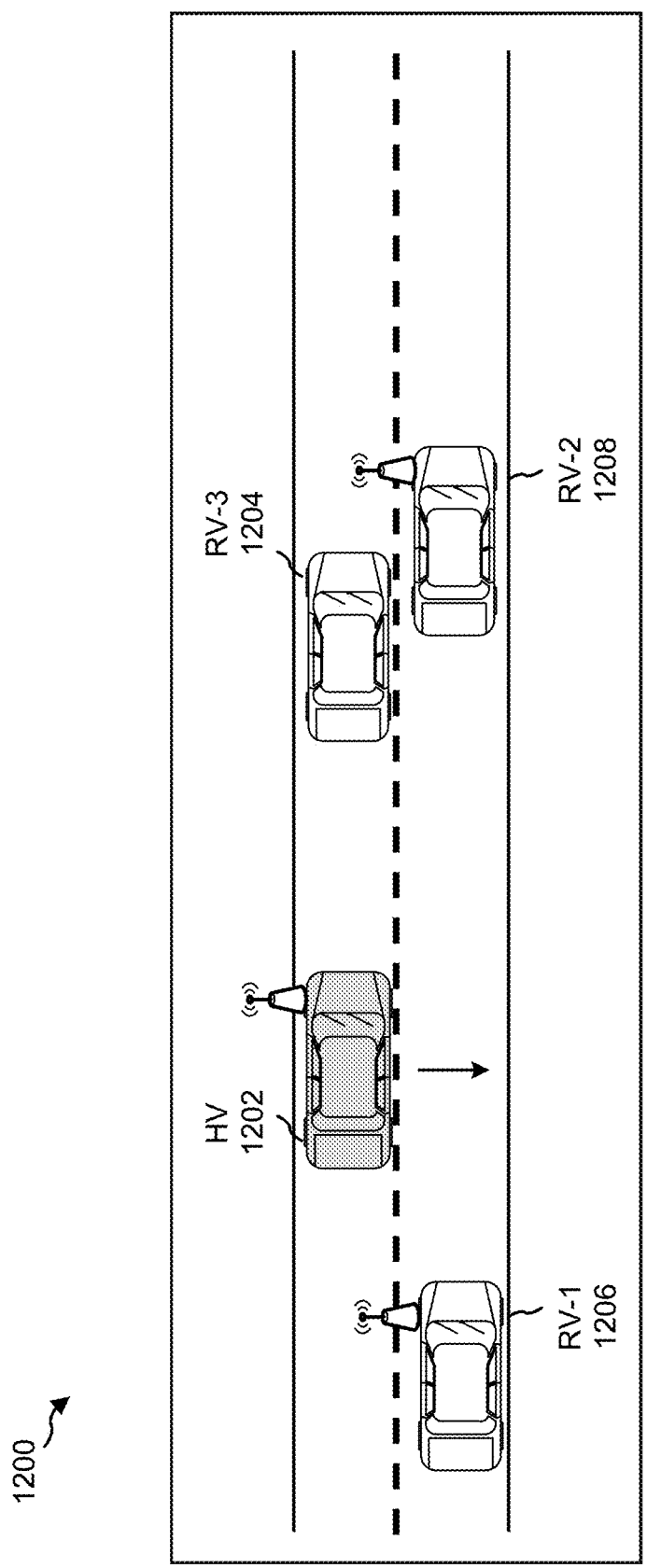
FIGS. 12A and 12B are diagrams that illustrate examples of vehicle configurations for a vehicle maneuver for a lane change scenario, in accordance with some aspects of the present disclosure.
Figure 12B:
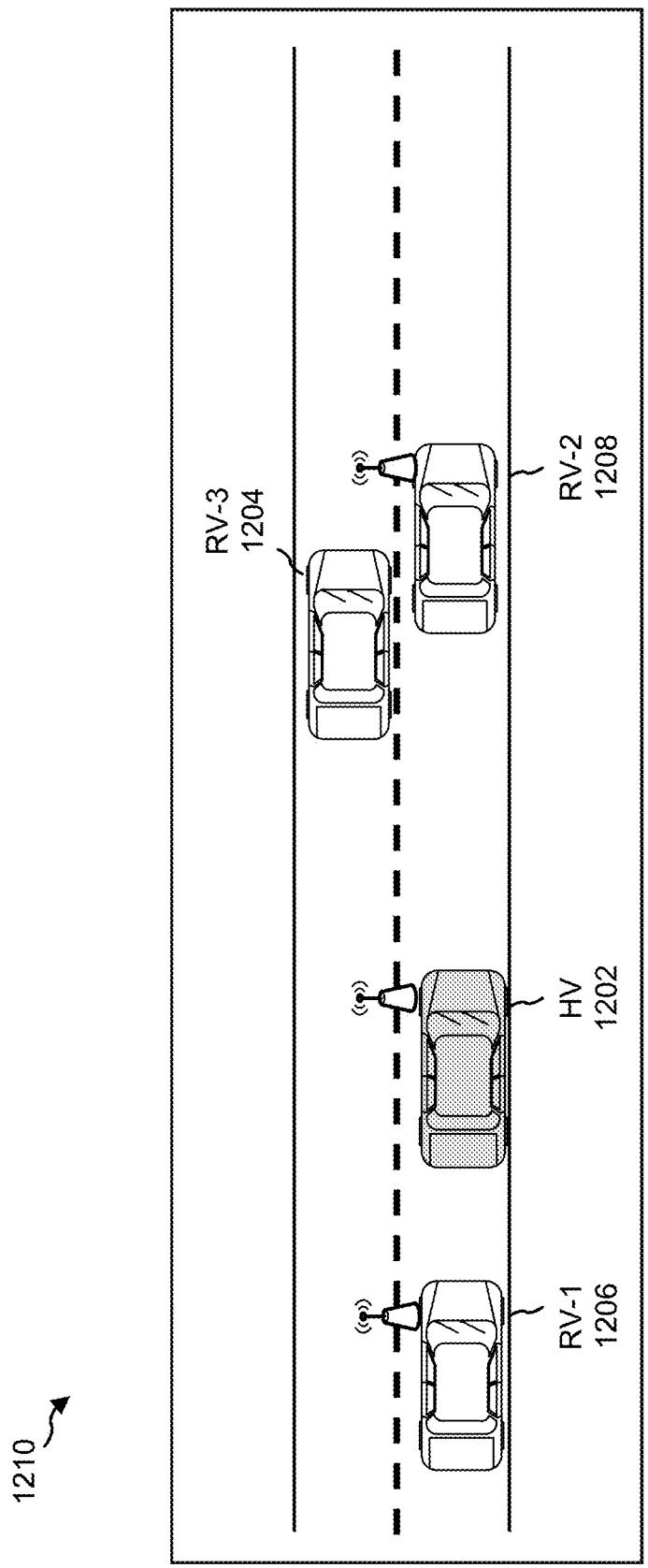
Figure 13:
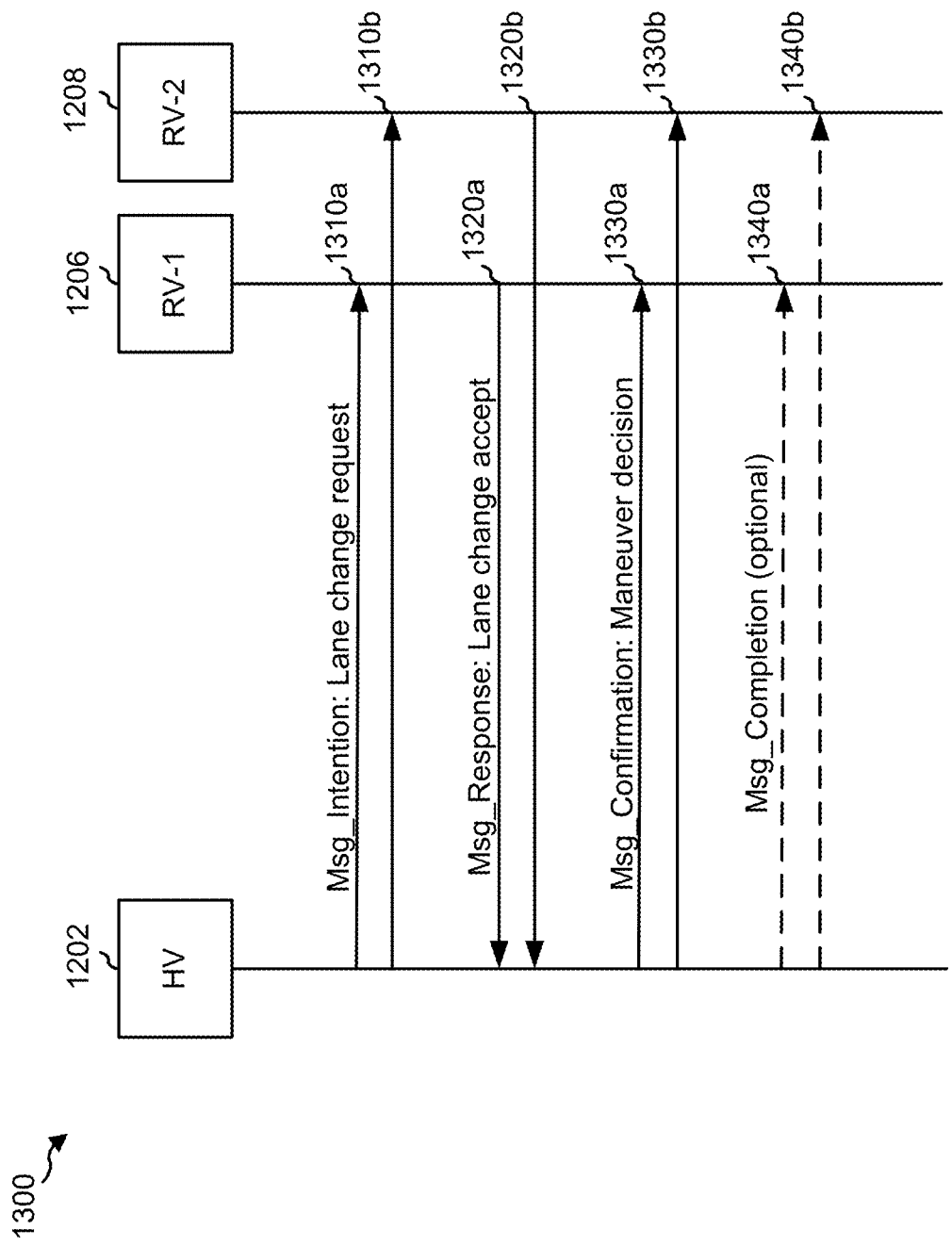
FIG. 13 is a diagram of an example of a communication (e.g., a V2X communications) exchange for the vehicle maneuver of FIGS. 12A and 12B, in accordance with some aspects of the present disclosure.

FIGS. 12A and 12B are diagrams that illustrate examples of vehicle configurations 1200, 1210 for a vehicle maneuver for a lane change scenario. FIG. 13 is a diagram of an example of a communication (e.g., a V2X communications) exchange 1300 for the vehicle maneuver of FIGS. 12A and 12B. In FIGS. 12A and 12B, the vehicle configuration 1200 is shown to include a plurality of equipped (e.g., V2X capable) network devices. The plurality of equipped network devices includes vehicles (e.g., automobiles) 1202 (HV), 1206 (RV-1), 1208 (RV-2). Also shown is a non-equipped network device, which includes a non-equipped vehicle 1204 (RV-3). The vehicle configuration 1200 may comprise more or less equipped network devices and/or more or less non-equipped network devices, than as shown in FIGS. 12A and 12B. In addition, the vehicle configuration 1200 may comprise more or less different types of equipped network devices (e.g., which may include equipped UEs) and/or more or less different types of non-equipped network devices (e.g., which may include non-equipped UEs), than as shown in FIGS. 12A and 12B. In addition, the equipped network devices may be equipped with heterogeneous capability, which may include, but is not limited to, C-V2X/DSRC capability, 4G/5G cellular connectivity, GPS capability, camera capability, radar capability, and/or LIDAR capability.

In one or more examples, the equipped network devices (e.g., vehicles 1202, 1206, 1208) may be capable of performing V2X communications. At least some of the equipped network devices (e.g., vehicles 1202, 1206, 1208) are capable of transmitting and receiving sensing signals for radar (e.g., RF sensing signals) and/or LIDAR (e.g., optical sensing signals) to detect nearby vehicles and/or objects. In one or more examples, vehicles 1202, 1206, 1208 may be capable of transmitting and receiving sensing signals of some kind (e.g., camera, radar, and/or LIDAR sensing signals). Some of the equipped network devices (e.g., vehicles 1202, 1206, 1208) may have higher capability sensors (e.g., GPS receivers, cameras, RF antennas, and/or optical lasers and/or optical sensors) than other equipped network devices (e.g., vehicles 1202, 1206, 1208).

During operation, the equipped network devices (e.g., vehicles 1202, 1206, 1208) may transmit and/or receive sensing signals (e.g., RF and/or optical signals) to sense and detect vehicles (e.g., vehicles 1202, 1204, 1206, 1208) and/or objects (not shown in FIGS. 12A and 12B) located within and surrounding the road. The equipped network devices (e.g., vehicles 1202, 1206, 1208) may utilize the sensing signals to determine characteristics (e.g., motion, dimensions, type, heading, and speed) of the detected vehicles and/or objects.

In one or more examples, the equipped network devices (e.g., vehicles 1202, 1206, 1208) may generate at least one vehicle-based message (e.g., an SDSM, a BSM, a CAM, a CPM, etc.) including information related to the characteristics of the detected vehicles and/or objects. The vehicle-based message may include a specific use case or safety warning (e.g., DNPW or FCW) related to the current conditions and environment of the equipped network device (e.g., vehicles 1202, 1206, 1208). The vehicle-based message may be in the form of a standard BSM, a CAM, a CPM, a SDSM (e.g., SAE J3224 SDSM), and/or other format.

In FIGS. 12A and 12B, the vehicle configuration 1200 depicts an example of a lane change scenario where vehicle 1202 (HV) wants to change lanes. In particular, in FIG. 12A, vehicles 1202, 1204, 1206, 1208 are all shown to be driving in the same direction on the freeway. Vehicles 1202 (HV) and 1204 (RV-3) are driving in the same lane as each other, with vehicle 1202 driving behind vehicle 1204. And, vehicles 1206 (RV-1) and 1208 (RV-2) are driving in the same lane as each other, with vehicle 1206 driving behind vehicle 1208. Vehicle 1202 desires to change lanes to move into a space located in between vehicle 1206 and vehicle 1208. As such, vehicle 1202 (or driver of the vehicle) desires to perform a lane change maneuver to move into a space located in between vehicles 1206 and 1208.

In one or more examples, vehicle 1202 may use a series of MSCMs to coordinate the lane change maneuver with vehicles 1206 and 1208. The use of MSCMs allows for the coordination and sharing of maneuver intents amongst vehicles for better road coordination. Vehicles (e.g., vehicles 1202, 1206, 1208) impacted by a potential maneuver (e.g., a lane change) can partake in a handshaking session using MSCMs to coordinate the maneuver. The handshaking session amongst the vehicles to coordinate a maneuver relies on the exchange of MSCMs and a communication protocol (e.g., basic protocol 1500 of FIG. 15 and emergency protocol 1600 of FIG. 16).

During operation of employing MSCMs for the performance of the lane change maneuver of FIGS. 12A and 12B, vehicle 1202 (HV) may transmit (e.g., shown as signals 1310a, 1310b of FIG. 13) an intent maneuver message (e.g., Msg_Intention: Lane change request) to vehicles 1206 (RV-1) and 1208 (RV-2) to notify vehicles 1206, 1208 of the vehicle's 1202 intent and desire to change lanes and move in a location between vehicles 1206 and 1208. In response, the vehicles 1206, 1208 may transmit (e.g., shown as signals 1320a, 1320b of FIG. 13) a response maneuver message (e.g., Msg_Response: Land change accept) to vehicle 1202 to indicate to vehicle 1202 that they acknowledge and accept the vehicle's 1202 intent and request to change lanes, and will assist vehicle 1202 with the requested lane changing maneuver.

After receiving the response maneuver message (e.g., Msg_Response: Land change accept) from vehicles 1206, 1208, vehicle 1202 may transmit (e.g., shown as signals 1330a, 1330b of FIG. 13) a confirmation maneuver message (e.g., Msg_Confirmation: Maneuver decision) to the vehicles 1206, 1208 to confirm that the vehicle 1202 has received their response maneuver messages (e.g., Msg_Response: Land change accept) and plans to perform the lane change maneuver. Then, vehicle 1202 may proceed to perform the lane change maneuver. After the vehicle 1202 has performed the lane change maneuver, the vehicle 1202 may optionally transmit (e.g., shown as signals 1340a, 1340b) a completion maneuver message (e.g., Msg_Completion) to vehicles 1206, 1208 to indicate to vehicles 1206, 1208 that the vehicle 1202 has completed the lane change maneuver. It should be noted that this is one example of a series of MSCMs that may be utilized by the vehicle 1202 (HV) to coordinate a lane change maneuver, and that more or less and/or other MSCMs may be employed for executing the maneuver.

Figure 14:
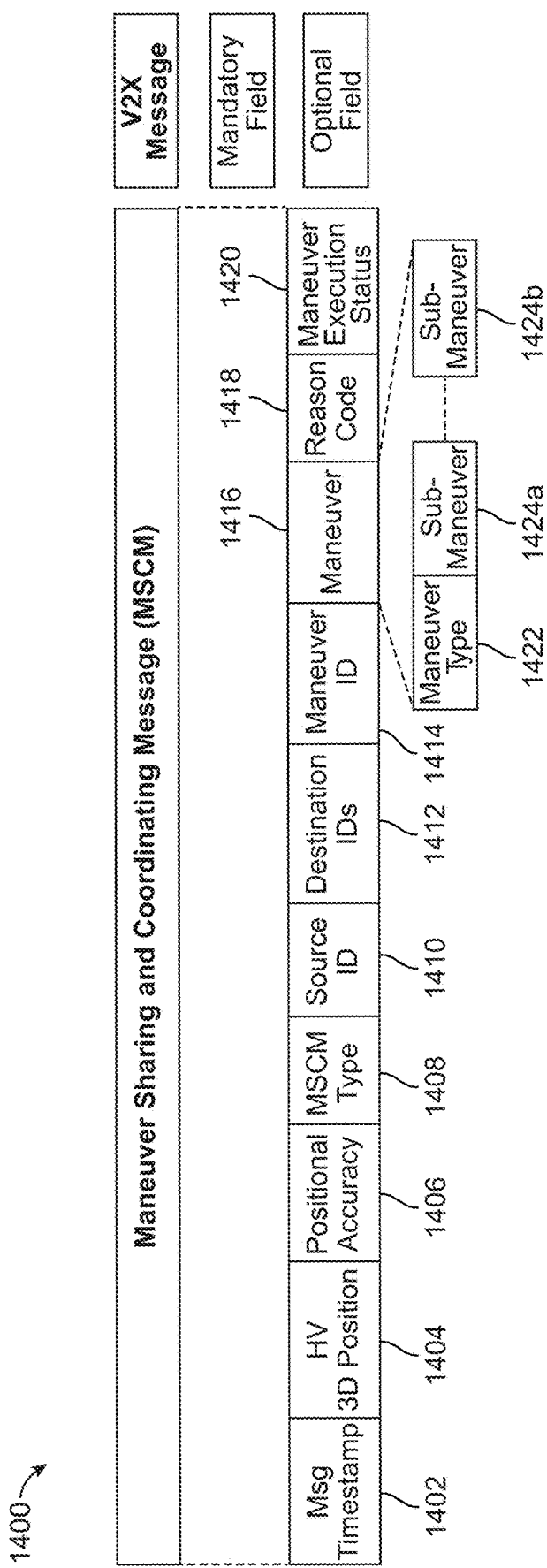
FIG. 14 is a diagram of an example Maneuver Sharing and Coordination Message (MSCM), in accordance with some aspects of the present disclosure.
Figure 15:
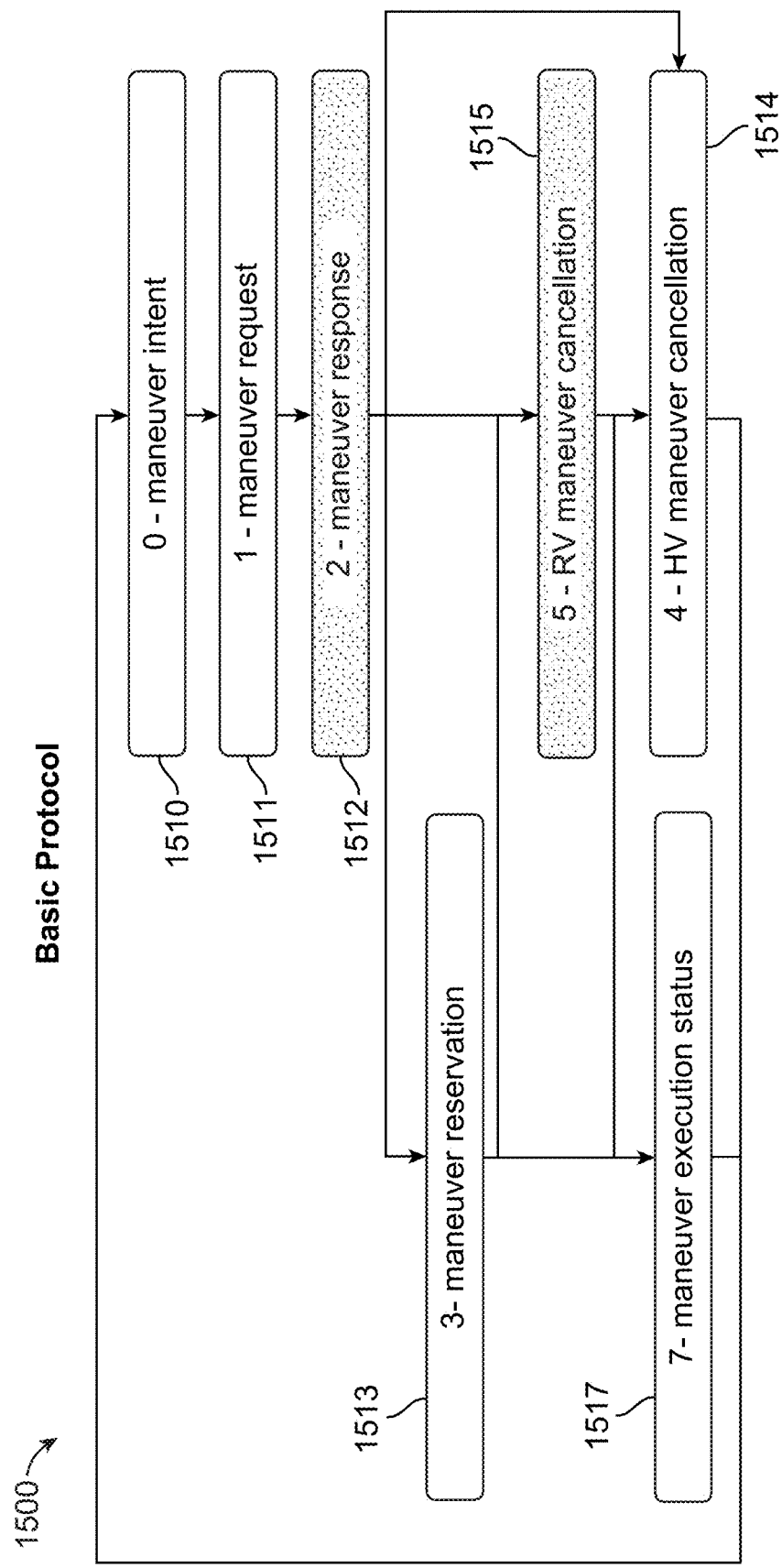
FIG. 15 is a diagram of an example basic protocol that may be employed for Maneuver Sharing and Coordination Messages (MSCMs), in accordance with some aspects of the present disclosure.

FIG. 14 is a diagram of an example MSCM 1400. In particular, the MSCM 1400 of FIG. 14 shows an MSCM format that is defined by Abstract Syntax Notation One (ASN.1), which is a standard interface description language for defining data structures that can be serialized/deserialized across platforms. In FIG. 14, the MSCM 1400 is shown to comprise a plurality of fields, which may include, but are not limited to, a Message (Msg) Timestamp 1402, HV three-dimensional (3D) Position 1404, Positional Accuracy 1406, MSCM Type 1408, Source ID 1410, Destination IDs 1412, Maneuver ID 1414, Maneuver 1416, Reason Code 1418, and Maneuver Execution Status 1420. In one or more examples, some of the fields of the MSCM 1400 may be optional, such as Destination IDs 1412, Maneuver ID 1414, Maneuver 1416, Reason Code 1418, and Maneuver Execution Status 1420. In some examples, the field for Maneuver 1416 may include sub-fields, which may include, but are not limited to, Maneuver Type 1422 and multiple Sub-Maneuvers 1424a, 1424b.

As previously mentioned, the MSCM Type 1408 of the MSCM 1400 indicates the specific type of the MSCM 1400. Specific types of MSCMs may include, but are not limited to, an intent maneuver message, a request maneuver message, a response maneuver message, a reservation maneuver message, an HV cancellation maneuver message, an RV cancelation maneuver message, and an execution status maneuver message.

In one or more examples, for the Source ID 1410 of the MSCM 1400, the Source ID of the last BSM transmitted by the source (e.g., the vehicle, such as an HV, generating and transmitting the MSCM 1400) may be employed for the Source ID 1410 of the MSCM 1400. In some examples, the Source ID 1410 of the MSCM 1400 may be related to the digital certificate of the source (e.g., the digital certificate of the vehicle generating and transmitting the MSCM 1400). In these examples, the encoded digital certificate of the source can be hashed (e.g., utilizing a hash algorithm or a fuzzy hash algorithm) to generate a hash code of the certificate. The hash code of the certificate may be used for the Source ID 1410 of the MSCM 1400. It should be noted that, as a privacy mechanism, the Source ID 1410 can change periodically over time.

As previously mentioned, the Maneuver 1416 of the MSCM 1400 may include Maneuver Type 1422 and multiple Sub-Maneuvers 1424a, 1424b. The Maneuver Type 1422 may indicate the specific type of the maneuver (e.g., overtake maneuver, merging maneuver, lane change maneuver, etc.). A maneuver may be broken into multiple sub-maneuvers, where each sub-maneuver (e.g., Sub-Maneuvers 1424a, 1424b) may indicate a specific movement of a plurality of movements (e.g., which may be performed by one or more vehicles) that are needed to accomplish the maneuver.

The Maneuver ID 1414, as previously mentioned, is similar to a Session ID, and is used to specifically identify the particular maneuver (e.g., an overtake maneuver, a merging maneuver, or a lane change maneuver). The Maneuver ID 1414 allows for vehicles to track updates for that specific maneuver. The Maneuver ID 1414 should be unique so as to avoid any possible maneuver ID collisions (e.g., occurring when two or more maneuvers have the same maneuver ID), which can lead to the cancelation of the maneuvers. There are, currently, no available solutions for generating a unique maneuver ID or for detecting attacks relating to colliding maneuver IDs, which can lead to multiple maneuver cancellations. The disclosed system and techniques provide a unique maneuver ID for each maneuver (e.g., process 1700 of FIG. 17) and provide misbehavior detection and reporting (MBDS) for maneuver ID collision (e.g., process 1800 of FIG. 18).

FIG. 15 is a diagram of an example basic protocol 1500 that may be employed for MSCMs. The basic protocol 1500 may include a plurality of different message types that may be utilized in a handshaking manner between a source (e.g., HV) that desires the maneuver and recipients (e.g., RVs) during ordinary operating conditions (e.g., non-emergency situations) by ordinary vehicles (e.g., non-emergency vehicles). In FIG. 15, the basic protocol 1500 is shown to include a plurality of different MSCM types (e.g., MSCM Type 1408 of FIG. 14) utilized to coordinate a maneuver (e.g., an overtake maneuver, a merging maneuver, or a lane change maneuver). The specific types of the MSCMs may include, but are not limited to, maneuver intent (e.g., MSCM type zero) 1510, maneuver request (e.g., MSCM type one) 1511, maneuver response (e.g., MSCM type two) 1512, maneuver reservation (e.g., MSCM type three) 1513, HV maneuver cancellation (e.g., MSCM type four) 1514, RV maneuver cancellation (e.g., MSCM type five) 1515, and maneuver execution status (e.g., MSCM type seven) 1517. In one or more examples, the maneuver intent (e.g., MSCM type zero) 1510 may be optional for the basic protocol 1500. For these examples, the source (e.g., HV) may start the protocol with the maneuver request (e.g., MSCM type one) 1511.

It should be noted that some of the MSCM types of the basic protocol 1500 may be designated for the source (e.g., HV) that desires and intends the maneuver, and other MSCM types may be designated for the recipients (e.g., RVs). For example, the maneuver intent (e.g., MSCM type zero) 1510, maneuver request (e.g., MSCM type one) 1511, maneuver reservation (e.g., MSCM type three) 1513, HV maneuver cancellation (e.g., MSCM type four) 1514, and maneuver execution status (e.g., MSCM type seven) 1517 may be designated for the source. The maneuver response (e.g., MSCM type two) 1512 and RV maneuver cancellation (e.g., MSCM type five) 1515 may be designated for the recipients.

Figure 16:
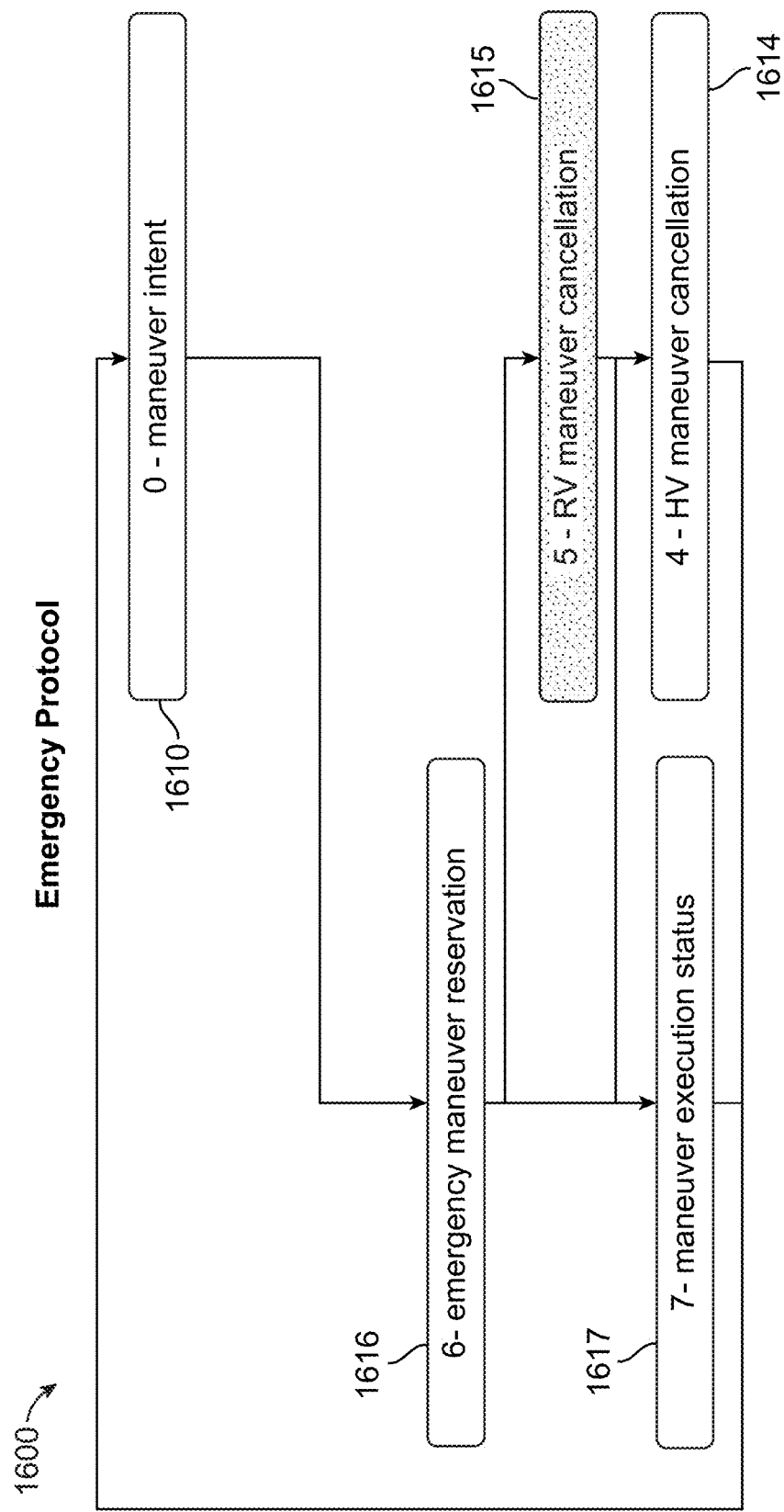
FIG. 16 is a diagram of an example emergency protocol that may be employed for MSCMs, in accordance with some aspects of the present disclosure.

FIG. 16 is a diagram of an example emergency protocol 1600 that may be employed for MSCMs. The emergency protocol 1600 may include a plurality of different message types that may be utilized in a handshaking manner between a source (e.g., HV) and recipients (e.g., RVs) during emergency conditions by emergency vehicles (e.g., police). In FIG. 16, the emergency protocol 1600 is shown to include a plurality of different MSCM types (e.g., MSCM Type 1408 of FIG. 14) utilized to coordinate a maneuver. The specific types of the MSCMs may include, but are not limited to, maneuver intent (e.g., MSCM type zero) 1610, emergency maneuver reservation (e.g., MSCM type six) 1616, HV maneuver cancellation (e.g., MSCM type four) 1614, RV maneuver cancellation (e.g., MSCM type five) 1615, and maneuver execution status (e.g., MSCM type seven) 1617.

Some of the MSCM types of the emergency protocol 1600 may be designated for the source (e.g., HV), and other MSCM types may be designated for the recipients (e.g., RVs). For example, the maneuver intent (e.g., MSCM type zero) 1610, emergency maneuver reservation (e.g., MSCM type six) 1616, HV maneuver cancellation (e.g., MSCM type four) 1614, and maneuver execution status (e.g., MSCM type seven) 1617 may be designated for the source. The RV maneuver cancellation (e.g., MSCM type five) 1615 may be designated for the recipients.

There may be some situations where a maneuver negotiation, utilizing either the basic protocol 1500 or the emergency protocol 1600, may be aborted (e.g., HV maneuver cancellation (e.g., MSCM type four) 1514, 1614 and Remote Vehicle (RV) maneuver cancellation (e.g., MSCM type five) 1515, 1615 of FIGS. 15 and 16). Some situations where a maneuver negotiation may be aborted include, but are not limited to, an absence of a response within a certain predetermined amount of time, misbehavior attacks (e.g., an attacker spoofing the source ID of a maneuver of a maneuver session), a malfunctional device (e.g., a malfunctioning vehicle component) preventing the maneuver from occurring, and non-compliance with the sequences outlined within the protocol (e.g., the basic protocol 1500 of FIG. 15 or the emergency protocol 1600 of FIG. 16).

Figure 17:
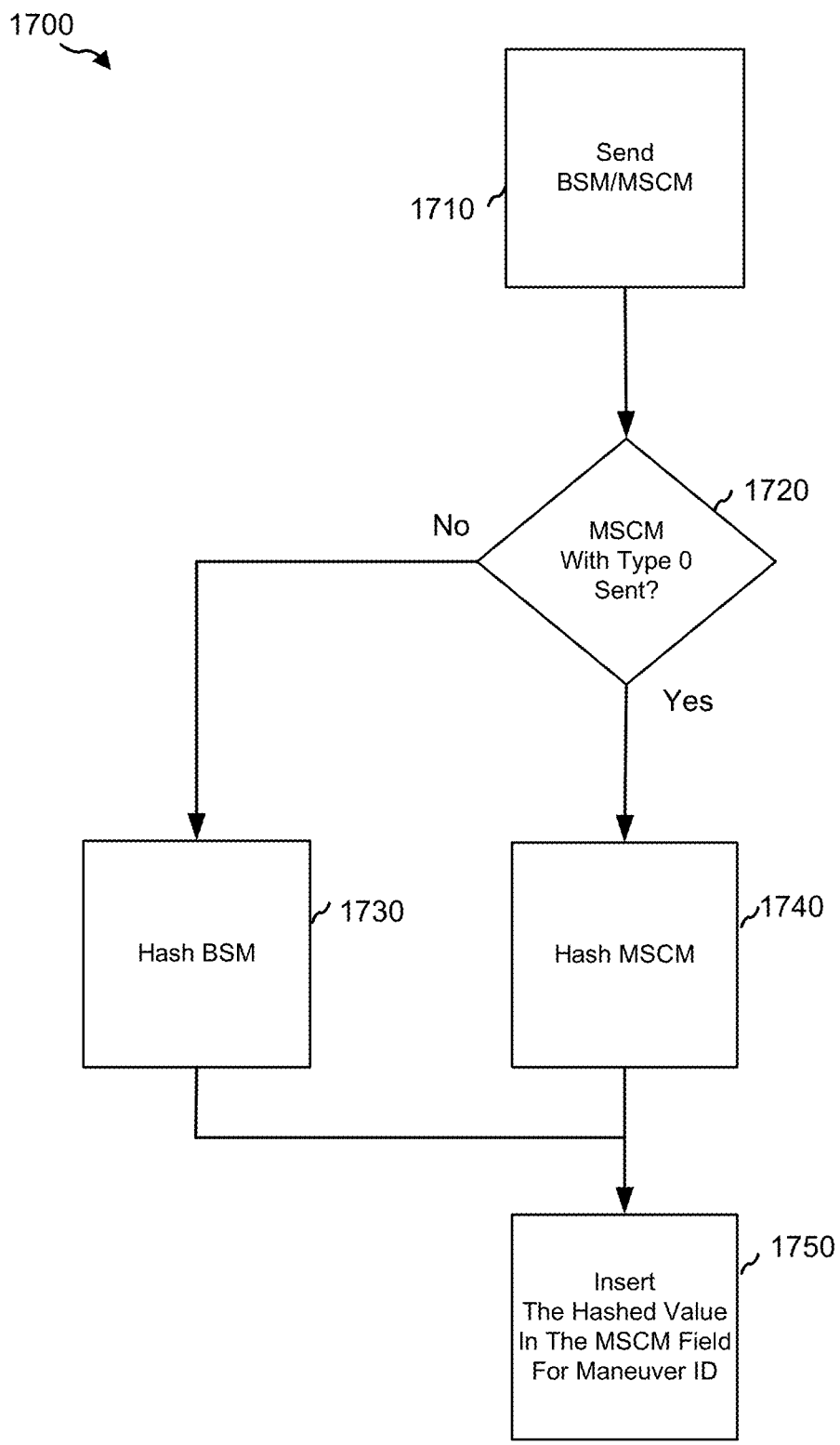
FIG. 17 is a flow diagram illustrating an example of a process for generating unique maneuver IDs for communications (e.g., V2X communications), in accordance with some aspects of the present disclosure.

FIG. 17 is a flow diagram illustrating an example of a process 1700 for generating unique maneuver IDs for communications (e.g., V2X communications). The process 1700 includes generating a unique maneuver ID based on a preceding message that is transmitted prior to a maneuver message (e.g., a MSCM message). The process 1700 may involve different approaches, such as a first approach that involves the transmission of a safety message (e.g., BSM) that is used as the preceding message and a second approach that involves the transmission of a maneuver message of intent (e.g., MSCM type zero that indicates an intent to perform a potential maneuver) that is used as the preceding message. In one or more examples, the process 1700 for generating unique maneuver IDs may be contributed to the SAE J1386 standard.

For the first approach for generating a unique maneuver ID, at block 1710, prior to transmitting a maneuver message of intent (e.g., MSCM type zero) or a maneuver message of request (e.g., MSCM type one), a safety message (e.g., BSM) can be transmitted by a source (e.g. HV). After the safety message (e.g., BSM) is transmitted, it can be determined whether a message of intent (e.g., MSCM type zero) was transmitted, at block 1720. Since a message of intent (e.g., MSCM type zero) was not transmitted, at block 1730, the safety message (e.g., BSM) can be hashed (e.g., by utilizing a hash algorithm or a fuzzy hash algorithm) to generate a hashed safety message. Then, at block 1750, the hashed safety message may be inserted into the field for the Maneuver ID 1414 for the maneuver message of request (e.g., MSCM type one) to be subsequently transmitted.

In one or more examples (e.g., for the first approach), the source (e.g., HV) may not transmit a maneuver message of intent (e.g., MSCM type zero). The transmission of the maneuver message of intent (e.g., MSCM type zero) can depend upon a number of factors, which may include, but are not limited to, the vehicle settings, the driving context (e.g., the necessity to perform the maneuver quickly), and the channel bandwidth.

For the second approach for generating a unique maneuver ID, at block 1710, prior to transmitting a maneuver message of request (e.g., MSCM type one), a maneuver message of intent (e.g., MSCM type zero) can be transmitted by a source (e.g. HV). After the maneuver message of intent (e.g., MSCM type zero) is transmitted, it can be determined whether a message of intent (e.g., MSCM type zero) was transmitted, at block 1720. Since a maneuver message of intent (e.g., MSCM type zero) was transmitted, at block 1740, the maneuver message of intent (e.g., MSCM type zero) can be hashed (e.g., by utilizing a hash algorithm or a fuzzy hash algorithm) to generate a hashed maneuver message of intent. Then, at block 1750, the hashed maneuver message of intent may be inserted into the field for the Maneuver ID 1414 for the maneuver message of request (e.g., MSCM type one) to be subsequently transmitted.

In one or more examples (e.g., for the second approach), the source (e.g., HV) may not transmit a safety message (e.g., BSM) between two MSCM sessions. The transmission of a safety message (e.g., BSM) between two MSCM sessions may depend upon a number of factors, which may include, but are not limited to, an emergency situation occurring, the cancellation of a first MSCM session by an RV, and the necessity of sending a BSM.

Figure 18:
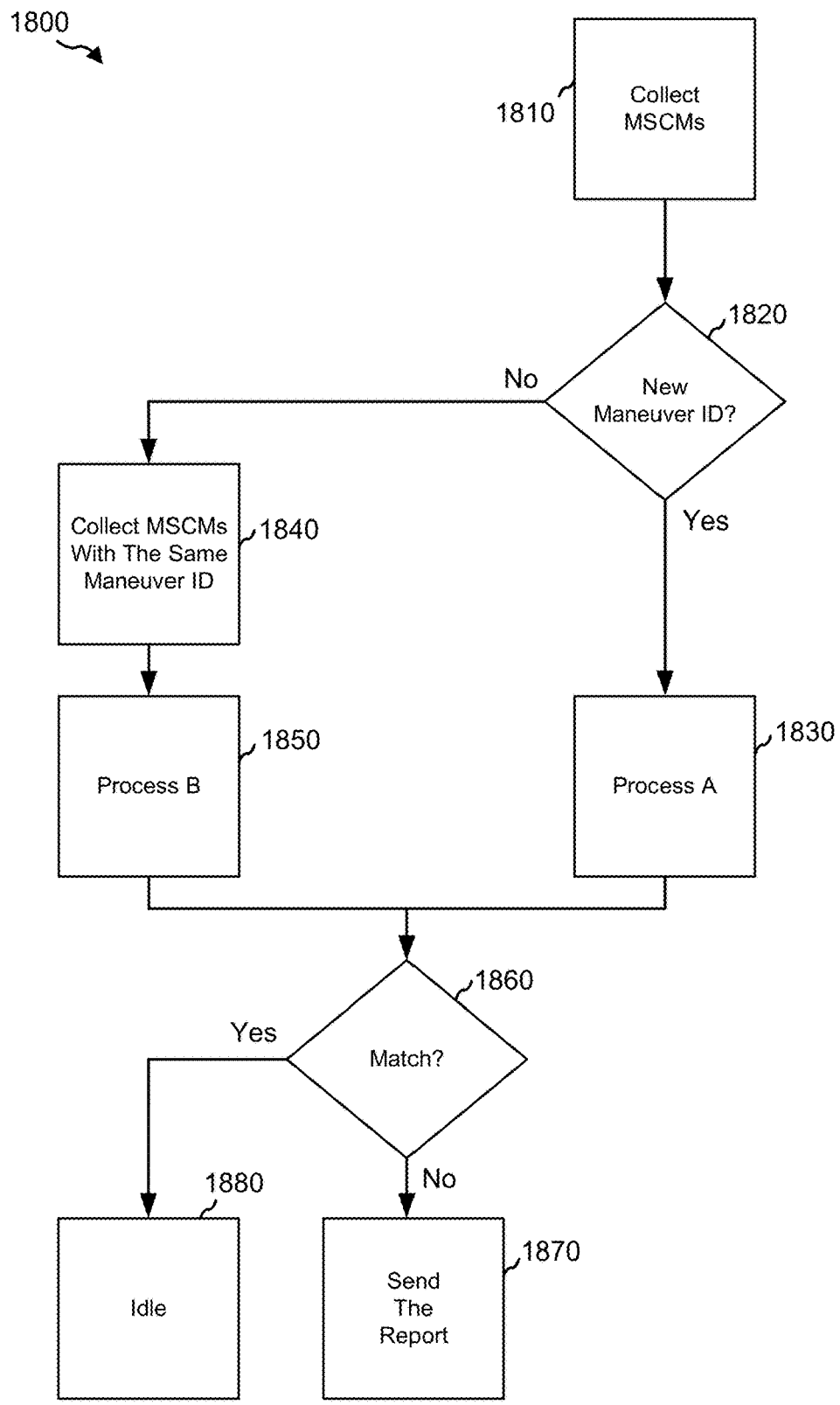
FIG. 18 is a flow diagram illustrating an example of a process for a local Misbehavior Detector and Reports (MBDR) scheme for maneuver ID collision for communications (e.g., V2X communications), in accordance with some aspects of the present disclosure.

FIG. 18 is a flow diagram illustrating an example of a process 1800 for a local Misbehavior Detector and Reports (MBDR) scheme for detecting maneuver ID and/or source ID collision for communications (e.g., V2X communications). As previously mentioned, in some aspects, for the MBDS for maneuver ID collision, the misbehavior detection may include two processes, including a first process (e.g., Process A 1830) to determine whether a newly received maneuver ID matches a locally generated maneuver ID (e.g., by using the hashing-based technique described above with respect to FIG. 17), and a second process (e.g., Process B 1850) to verify whether an attacker has spoofed the source ID of the maneuver of the maneuver session. In some cases, the first process (e.g., process A) can include verifying that the maneuver ID is generated by a particular source ID (e.g., generated by the vehicle associated with the source ID of the maneuver). When a misbehavior has been detected (e.g., for either or both of the processes), a misbehavior report containing specific details of the detected misbehavior, can be generated and sent (e.g., transmitted) to nearby vehicles, a server, and/or other system or device. In one or more examples, the process 1800 for a local MBDR scheme for maneuver and/or source ID collision may be contributed to the European Telecommunications Standards (ETSI) Technical Specification (TS) 103 759 standard or other standard.

It should be noted that an attacker may provoke attacks with colliding maneuver IDs. For example, an attacker may be able to spoof the maneuver ID by predicting the maneuver ID. In such an example, an attacker may know that the next maneuver ID will be an incrementation of the previously used maneuver ID sent by the source (e.g., the HV). The attacker may then start the next maneuver session before the source (e.g., HV) with a maneuver ID of, for example, two (2). The source (e.g., HV) may then start the next maneuver also with the same maneuver ID, for example, with a value of two. Since both of the maneuver IDs include a value of two for the maneuvers, the asynchronous message exchange will provoke the cancellation of both of the maneuvers. The attacker could then repeat the same procedure, but now using the next maneuver ID, for example a value of three (3), thereby resulting again in a cancellation of both of the new maneuvers. And, the source (e.g., HV), who is the victim of the attacks, could mistakenly be reported as being the misbehaving vehicle (e.g., the attacker).

For the process 1800 of FIG. 18, at block 1810, a plurality of MSCMs are collected. The plurality of MSCMs may or may not include the same Source ID 1410. At block 1820, the process 1800 includes determining whether any of the collected MSCMs have a new Maneuver ID 1414 (e.g., whether any of the collected MSCMs have a different Maneuver ID than the other collected MSCMs).

When it is determined that at least one of the collected MSCMs has a new Maneuver ID 1414, the process 1800 proceeds to Process A 1830. At Process A 1830, for each MSCM with a particular type (e.g., a MSCM Type 1408 of one (1)), the Maneuver ID 1414 (and, in some cases, the Source ID 1410) are collected. Then, the last transmitted safety message (e.g., BSM) and/or the previously transmitted MSCM (e.g., with a MSCM Type 1408 of zero (0)) are obtained/checked. Then, the last transmitted safety message (e.g., BSM) and/or the previously transmitted MSCM (e.g., with the MSCM Type 1408 of zero) are hashed to generate a hashed message (e.g., with a hash code). For example, the process 1800 may utilize a hash algorithm or a fuzzy hash algorithm to generate the hashed message (e.g., with the hash code). Then, the generated hashed message (e.g., the hash code) can be compared with the maneuver ID of the corresponding MSCM (e.g., with a MSCM Type 1408 of one). Because the maneuver ID of the corresponding MSCM is also generated using the same hashing algorithm of the same preceding message (e.g., the safety message such as the BSM and/or the previously transmitted MSCM, such as with the MSCM Type 1408 of zero), the maneuver IDs should match if no nefarious activity or error is present.

After process A 1830 has been performed, at block 1860, it can be determined whether there is a match between the hash code computed during Process A 1830 and the maneuver ID of the corresponding MSCM with a MSCM Type 1408 of one. If it is determined that there is a match, at block 1880, the process 1800 will merely go idle (e.g., by performing normal maneuver protocol operations, such as those described with respect to FIG. 15 or FIG. 16). However, if it is determined that there is not a match, at block 1870, a misbehavior report can be generated and sent (e.g., transmitted) to the network such as to a backend server, to one or more other vehicles, and/or to other devices or systems.

However, when it is determined that none of the collected MSCMs have a new Maneuver ID 1414, at block 1840, of the collected MSCMs with the same Source ID 1410 obtained at block 1810, a plurality of MSCMs with the same Maneuver ID 1414 are collected. After the plurality of MSCMs with the same Maneuver ID 1414 are collected, the process 1800 proceeds to Process B 1850. At Process B 1850, for the plurality of MSCMs with the same Maneuver ID 1414, the process 1800 can determine whether the source IDs of the plurality of MSCMs match. In some cases, the process 1800 can include obtaining or collecting the MSCMs with MSCM Types 1408 of one (1), three (3), and four (4). Then, the Source IDs 1410 of all of the collected MSCMs with MSCM Types 1408 of one, two, three, four, and seven can be compared with each other.

After process B 1850 has been performed, at block 1860, it can be determined whether there is a match between all of the Source IDs 1410 of all of the collected MSCMs with MSCM Types 1408 of one, two, three, four, and seven. If it is determined that there is a match (e.g., all of the Source IDs 1410 are the same), at block 1880, the process 1800 will go idle (e.g., perform normal maneuver protocol operations, such as those described with respect to FIG. 15 or FIG. 16). However, if it is determined that there a source ID of one MSCM is different from a source ID of another MSCM and thus that there is not a match (e.g., at least one of the Source IDs 1410 is different), at block 1870, a misbehavior report is generated (e.g., generated for the MSCM with the different Source ID 1410) and sent (e.g., transmitted) to the network (e.g., a backend server) and/or to other vehicles.

In one or more examples, the generated misbehavior report can contain a notification of the type of attack detected (e.g., colliding Maneuver IDs 1414) and/or an identification of the colliding MSCMs.

In one or more examples, a plurality of different types of hash algorithms can be employed for the hashing performed in the process 1700 of FIG. 17 and the process 1800 of FIG. 18. Different types of hash algorithms that may be employed may include, but are not limited to, a SHA-256 algorithm, a Merkle-Damgard algorithm, a MD5 algorithm, a SHA-1 algorithm, a SHA-2 algorithm, RIPEMD-160 algorithm, a Whirlpool algorithm, and a BLAKE 2 algorithm.

Figure 19:
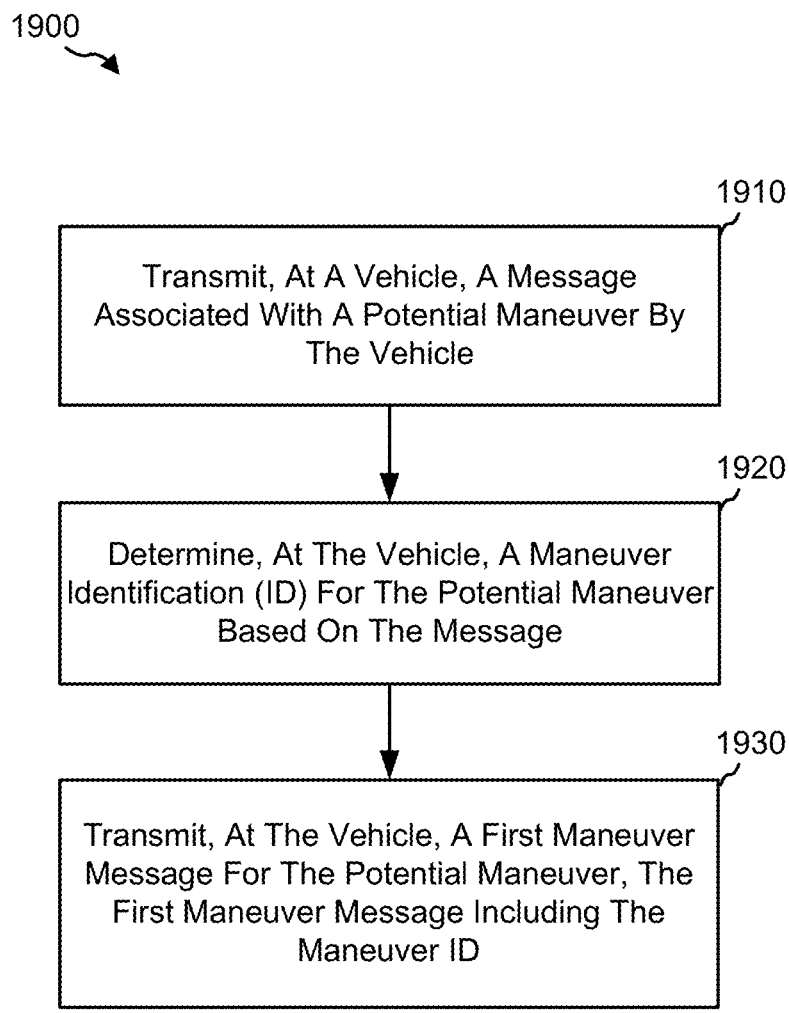
FIG. 19 is a flow diagram illustrating an example of a process for wireless communications, in accordance with some aspects of the present disclosure.

FIG. 19 is a flow diagram illustrating an example of a process 1900 for wireless communications at a vehicle (e.g., by the vehicle or by a component or system of the vehicle, such as a chipset, a communication system of the vehicle such as communication system 558 of FIG. 5, a control system of the vehicle such as control system 552 of FIG. 5, any combination thereof, or other component or system of the vehicle). The process 1900 can securely manage maneuver IDs for communications (e.g., V2X communications), in accordance with some aspects of the present disclosure. In some aspects, the vehicle is configured to communicate using a V2X protocol.

At block 1910, the vehicle (or component or system thereof) may transmit a message associated with a potential maneuver by the vehicle. In some cases, the message is a safety message, such as a BSM as that described with respect to FIG. 17. In some cases, the message is a maneuver message, such as a MSCM. In one illustrative example, the message is an MSCM (e.g., an MSCM of type 0) indicating an intent to perform the potential maneuver, such as shown in FIG. 15 and described with respect to FIG. 17.

At block 1920, the vehicle (or component or system thereof) may determine a maneuver identification (ID) for the potential maneuver based on the message. In some aspects, to determine the maneuver ID for the potential maneuver based on the message, the vehicle (or component or system thereof) may apply a hashing algorithm to the message to generate a hashed message, in which case the maneuver ID includes the hashed message. As noted herein, different types of hash algorithms may be used. Examples of hash algorithms that may be used can include, but are not limited to, a SHA-256 algorithm, a Merkle-Damgard algorithm, a MD5 algorithm, a SHA-1 algorithm, a SHA-2 algorithm, RIPEMD-160 algorithm, a Whirlpool algorithm, a BLAKE 2 algorithm, any combination thereof, or other hash algorithm.

At block 1930, the vehicle (or component or system thereof) may transmit a first maneuver message for the potential maneuver. The first maneuver message includes the maneuver ID (e.g., the maneuver ID 1414 in the maneuver ID field of the MSCM 1400 of FIG. 14). In some aspects, the first maneuver message is a MSCM. In one illustrative example, the message is an MSCM (e.g., an MSCM of type 1) indicating a request to perform the potential maneuver, such as shown in FIG. 15 and described with respect to FIG. 17.

Figure 20:
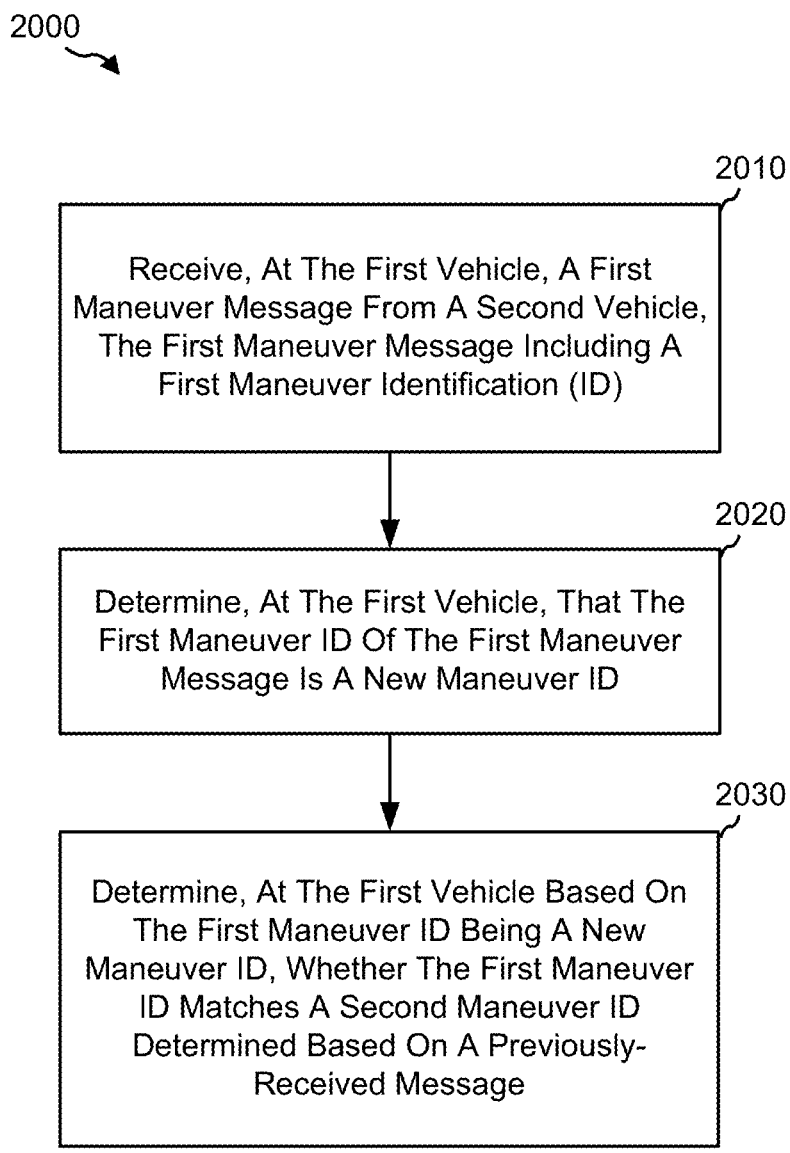
FIG. 20 is a flow diagram illustrating another example of a process for wireless communications, in accordance with some aspects of the present disclosure.

FIG. 20 is a flow diagram illustrating an example of a process 2000 for wireless communications at a first vehicle (e.g., by the first vehicle or by a component or system of the first vehicle, such as a chipset, a communication system of the vehicle such as communication system 558 of FIG. 5, a control system of the vehicle such as control system 552 of FIG. 5, any combination thereof, or other component or system of the vehicle). The process 2000 can securely manage maneuver IDs for communications (e.g., V2X communications), in accordance with some aspects of the present disclosure. In some aspects, the first vehicle is configured to communicate using the V2X protocol.

At block 2010, the first vehicle (or component or system thereof) may receive a first maneuver message from a second vehicle. The first maneuver message includes a first maneuver ID.

At block 2020, the first vehicle (or component or system thereof) may determine that the first maneuver ID of the first maneuver message is a new maneuver ID (e.g., as shown at block 1820 of FIG. 18). For example, the first vehicle (or component or system thereof) may determine whether the first maneuver message has a different maneuver ID than any other received or collected messages (e.g., MSCMs).

At block 2030, the first vehicle (or component or system thereof) may determine, based on the first maneuver ID being a new maneuver ID, whether the first maneuver ID matches a second maneuver ID determined based on a previously-received message (e.g., as shown at blocks 1830 and 1860 of FIG. 18). For example, in some aspects, the first vehicle (or component or system thereof) may apply a hashing algorithm to the previously-received message to generate a hashed message, where the second maneuver ID includes the hashed message (e.g., the second maneuver ID is the hashed message). The first vehicle (or component or system thereof) may then compare the second maneuver ID to the first maneuver ID to determine whether the first maneuver ID and the second maneuver ID match. As noted above, any hashing algorithm may be used, such as using a SHA-256 algorithm, a Merkle-Damgard algorithm, a MD5 algorithm, a SHA-1 algorithm, a SHA-2 algorithm, RIPEMD-160 algorithm, a Whirlpool algorithm, a BLAKE 2 algorithm, any combination thereof, or other hash algorithm. In some aspects, the first maneuver message is a first MSCM and the previously-received message is a second MSCM. In some cases, the second MSCM indicates an intent to perform a potential maneuver, such as an MCSM message with type 0. In some cases, the first maneuver message is a MSCM and the previously-received message is a safety message, such as a BSM.

In one example, the first vehicle (or component or system thereof) may determine that the first maneuver ID is different from the second maneuver ID. The first vehicle (or component or system thereof) may transmit a misbehavior report (e.g., as shown at block 1870 of FIG. 18) to at least one of a backend server or one or more other vehicles based on determining that the first maneuver ID is different from the second maneuver ID. In some aspects, the misbehavior report includes a type of attack, a colliding maneuver message detected from the maneuver message, the type of attack and the colliding maneuver message, and/or other information.

In another example, the first vehicle (or component or system thereof) may determine that the first maneuver ID is the same or matches the second maneuver ID. The first vehicle (or component or system thereof) may remain idle (e.g., as shown at block 1880 of FIG. 18, for instance by performing normal maneuver protocol operations, such as those described with respect to FIG. 15 or FIG. 16) based on determining that the first maneuver ID is the same or matches the second maneuver ID.

Figure 21:
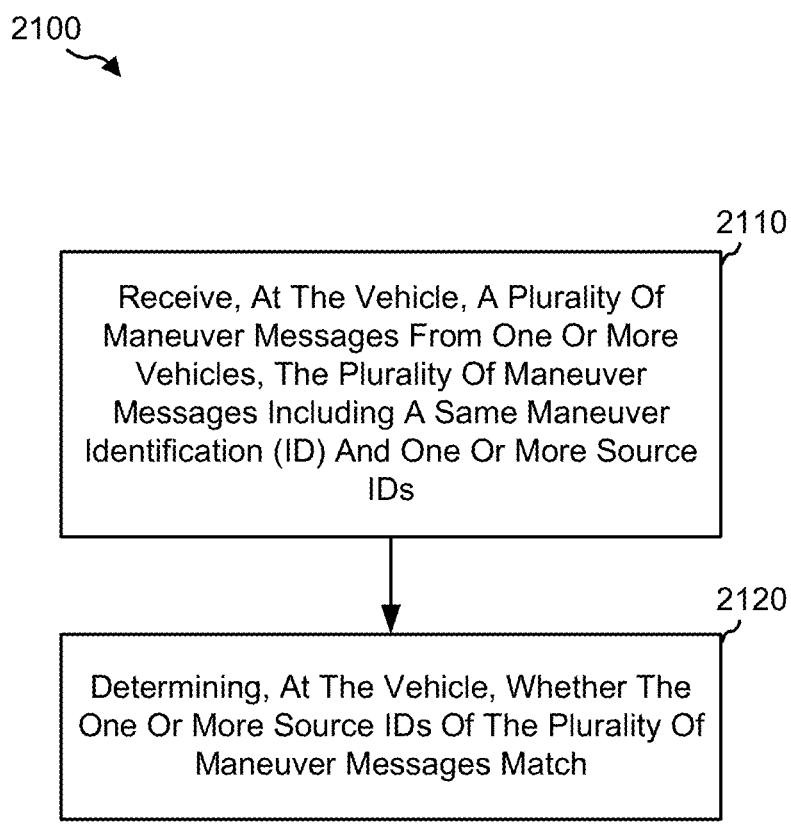
FIG. 21 is a flow diagram illustrating another example of a process for wireless communications, in accordance with some aspects of the present disclosure.

FIG. 21 is a flow diagram illustrating an example of a process 2100 for wireless communications at a vehicle (e.g., by the vehicle or by a component or system of the vehicle, such as a chipset, a communication system of the vehicle such as communication system 558 of FIG. 5, a control system of the vehicle such as control system 552 of FIG. 5, any combination thereof, or other component or system of the vehicle). The process 2100 can securely manage maneuver IDs for communications (e.g., V2X communications), in accordance with some aspects of the present disclosure. In some aspects, the first vehicle is configured to communicate using the V2X protocol.

At block 2110, the vehicle (or component or system thereof) may receive a plurality of maneuver messages from one or more vehicles (e.g., as shown at block 1810 of FIG. 18). The plurality of maneuver messages includes a same maneuver identification (ID) and one or more source IDs (e.g., each maneuver message of the plurality of maneuver messages has the same maneuver ID and the same or different source IDs). In some aspects, the plurality of maneuver messages includes a plurality of MSCMs. In some aspects, the plurality of maneuver messages may include one or more of a maneuver message indicating a request to perform a maneuver (e.g., an MSCM of type 1), a maneuver message indicating a reservation to perform the maneuver (e.g., an MSCM of type 3), or a maneuver message indicating a host vehicle canceling a performance of the maneuver (e.g., an MSCM of type 5).

At block 2120, the vehicle (or component or system thereof) may determine whether the one or more source IDs of the plurality of maneuver messages match (e.g., as shown at blocks 1850 and 1860 of FIG. 18). In one example, the vehicle (or component or system thereof) may determine that a source ID of a maneuver message from the plurality of maneuver messages is different from at least one other source ID of at least one other maneuver message from the plurality of maneuver messages. The vehicle (or component or system thereof) may transmit a misbehavior report to at least one of a backend server or one or more other vehicles (e.g., as shown at block 1870 of FIG. 18) based on determining that the source ID of the maneuver message is different from the at least one other source ID of the at least one other maneuver message. In some aspects, the misbehavior report includes a type of attack, a colliding maneuver message detected from the maneuver message, the type of attack and the colliding maneuver message, and/or other information.

In another example, the first vehicle (or component or system thereof) may determine that source ID of the plurality of maneuver messages is the same or matches. The first vehicle (or component or system thereof) may remain idle (e.g., as shown at block 1880 of FIG. 18, for instance by performing normal maneuver protocol operations, such as those described with respect to FIG. 15 or FIG. 16) based on determining that the source ID of the plurality of maneuver messages is the same or matches.

In some aspects, the vehicle (or component or system thereof) may determine that at least one maneuver ID of a maneuver message from the plurality of maneuver messages is a new maneuver ID (e.g., as shown at block 1820 of FIG. 18). For example, the first vehicle (or component or system thereof) may determine whether the maneuver message has a different maneuver ID than any other received or collected messages (e.g., MSCMs). The vehicle (or component or system thereof) may determine, based on the at least one maneuver ID being a new maneuver ID, whether the one or more source IDs of the plurality of maneuver messages match (e.g., performing the operation of block 1830 of FIG. 18 based on determining that the maneuver ID is new at block 1820).

Figure 22:
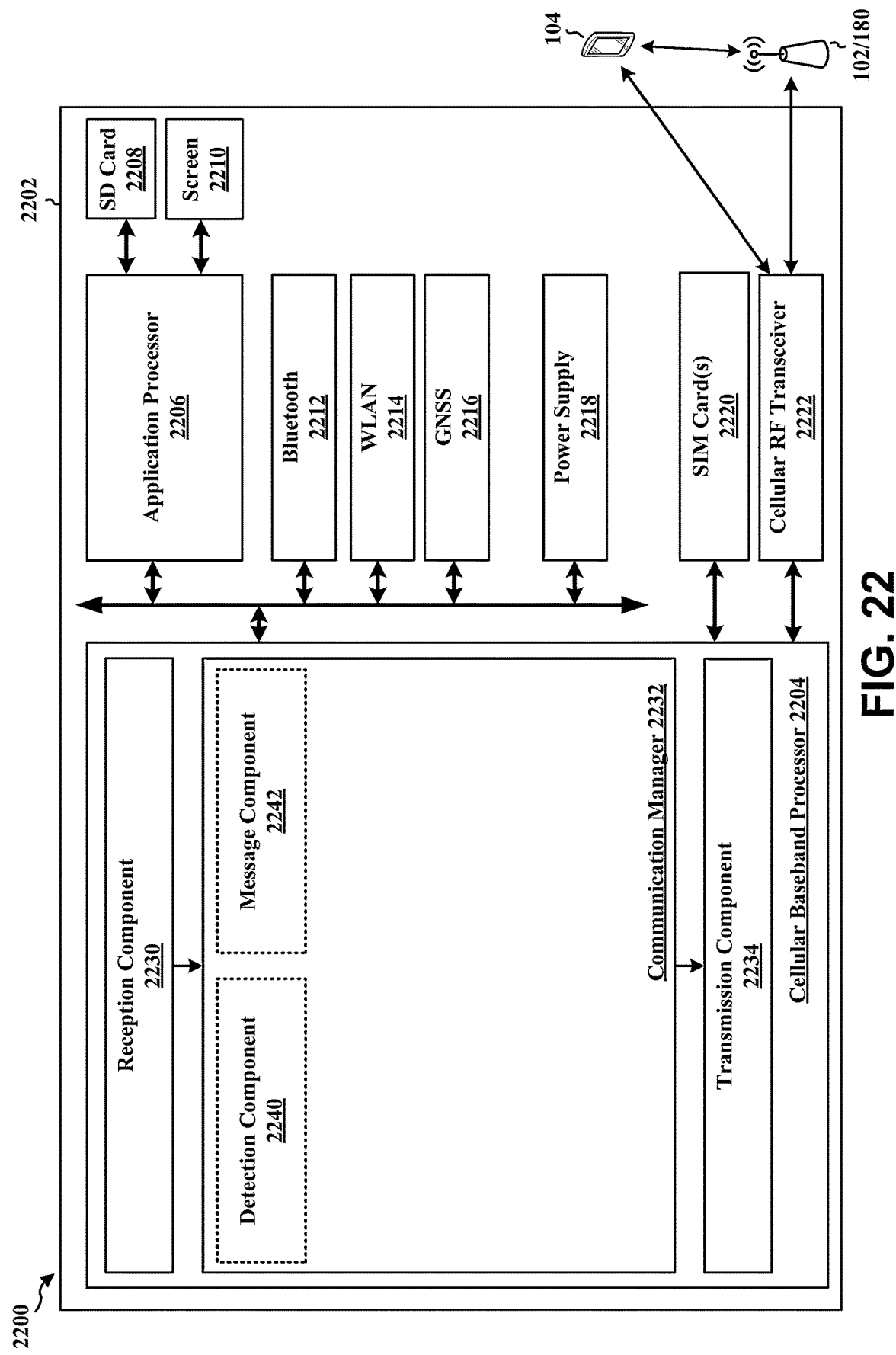
FIG. 22 is a diagram illustrating an example of a hardware implementation for an example apparatus, in accordance with some aspects of the present disclosure.

FIG. 22 is a diagram 2200 illustrating an example of a hardware implementation for an apparatus 2202. The apparatus 2202 is a UE and includes a cellular baseband processor 2204 (also referred to as a modem) coupled to a cellular RF transceiver 2222 and one or more subscriber identity modules (SIM) cards 2220, an application processor 2206 coupled to a secure digital (SD) card 2208 and a screen 2210, a Bluetooth module 2212, a wireless local area network (WLAN) module 2214, a GNSS module 2216, and a power supply 2218. The GNSS module 2216 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 2204 communicates through the cellular RF transceiver 2222 with the UE 104 of FIG. 1 and/or BS 102/180 of FIG. 1. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components, including a detection component 2240 configured to detect one or more objects and a message component 2242 configured to generate one or more messages (e.g., SDSMs, CPMs, BSMs, etc.). The components within the communication manager 2232 may be stored in the computer-readable medium/memory and/or configured as hardware within the cellular baseband processor 2204. The cellular baseband processor 2204 may be a component of the UE 350 of FIG. 3A and may include the memory 360 of FIG. 3A and/or at least one of the TX processor 368 of FIG. 3A, the RX processor 356 of FIG. 3A, and the controller/processor 359 of FIG. 3A. In one configuration, the apparatus 2202 may be a modem chip and include just the baseband processor 2204, and in another configuration, the apparatus 2202 may be the entire UE (e.g., see 350 of FIG. 3A) and include the aforediscussed additional modules of the apparatus 2202.

The apparatus may include additional components that perform each of the blocks of the algorithm in the aforementioned flowcharts of FIGS. 17, 18, and/or 19. As such, each block in the aforementioned flowcharts of FIGS. 17,

18, and/or 19 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 2202, and in particular the cellular baseband processor 2204, includes means for receiving, from a first wireless device, a message indicating a threat entity within a threat zone. The threat entity transmits data that interferes with transmission of BSMs. The apparatus includes means for determining a candidate resource of a set of candidate resources on which to transmit a BSM based at least in part on the message indicating information related to the threat entity from the first wireless device. The apparatus includes means for transmitting, to at least a third wireless device, the BSM on a determined candidate resource. The apparatus further includes means for excluding one or more candidate resources in the set of candidate resources based on a projected RSRP for each candidate resource in the set of candidate resources exceeding an RSRP threshold to determine a first subset of candidate resources. The apparatus further includes means for ranking the first subset of candidate resources based on a weighted RSSI ranking to obtain a second subset of candidate resources with a lowest weighted RSSI. The second subset of candidate resources is a portion of the first subset of candidate resources. The apparatus further includes means for selecting a candidate resource from the second subset of candidate resources. The apparatus further includes means for excluding one or more virtually sensed candidate resources in the set of candidate resources having an RSSI that exceeds a pre-filter threshold to obtain a filtered subset of candidate resources that do not exceed the pre-filter threshold. The apparatus further includes means for excluding candidate resources within the filtered subset of candidate resources that do not exceed the pre-filter threshold that exceed an RSRP threshold to obtain a second subset of candidate resources that do not exceed the RSRP threshold. The apparatus further includes means for selecting the candidate resource from the second subset of candidate resources. The aforementioned means may be one or more of the aforementioned components of the apparatus 2202 configured to perform the functions recited by the aforementioned means.

Specific details are provided in the description above to provide a thorough understanding of the aspects and examples provided herein, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual examples may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communications at a vehicle, the method comprising: transmitting, at the vehicle, a message associated with a potential maneuver by the vehicle; determining, at the vehicle, a maneuver identification (ID) for the potential maneuver based on the message; and transmitting, at the vehicle, a first maneuver message for the potential maneuver, the first maneuver message including the maneuver ID.

Aspect 2: The method of Aspect 1, wherein the message is a safety message.

Aspect 3: The method of Aspect 2, wherein the safety message is a basic safety message (BSM).

Aspect 4: The method of Aspect 1, wherein the message is a second maneuver message indicating an intent to perform the potential maneuver.

Aspect 5: The method of Aspect 4, wherein the second maneuver message is a maneuver sharing coordination message (MSCM).

Aspect 6: The method of any of Aspects 1 to 5, wherein the first maneuver message is a maneuver sharing coordination message (MSCM) indicating a request to perform the potential maneuver.

Aspect 7: The method of any of Aspects 1 to 6, wherein the vehicle is configured to communicate using a vehicle-to-everything (V2X) protocol.

Aspect 8: The method of any of Aspects 1 to 7, wherein determining the maneuver ID for the potential maneuver based on the message includes applying a hashing algorithm to the message to generate a hashed message, the maneuver ID including the hashed message.

Aspect 9: A method for wireless communications at a first vehicle, the method comprising: receiving, at the first vehicle, a first maneuver message from a second vehicle, the first maneuver message including a first maneuver identification (ID); determining, at the first vehicle, that the first maneuver ID of the first maneuver message is a new maneuver ID; and determining, at the first vehicle based on the first maneuver ID being a new maneuver ID, whether the first maneuver ID matches a second maneuver ID determined based on a previously-received message.

Aspect 10: The method of Aspect 9, wherein determining whether the first maneuver ID matches the second maneuver ID includes: applying a hashing algorithm to the previously-received message to generate a hashed message, the second maneuver ID including the hashed message; and comparing the second maneuver ID to the first maneuver ID.

Aspect 11: The method of any of Aspects 9 or 10, further comprising: determining, at the first vehicle, that the first maneuver ID is different from the second maneuver ID; and transmitting, at the first vehicle, a misbehavior report to at least one of a backend server or one or more other vehicles based on determining that the first maneuver ID is different from the second maneuver ID.

Aspect 12: The method of Aspect 11, wherein the misbehavior report comprises at least one of a type of attack or a colliding maneuver message detected from the first maneuver message.

Aspect 13: The method of any of Aspects 9 to 12, wherein the first maneuver message is a first maneuver sharing coordination message (MSCM) and the previously-received message is a second MSCM.

Aspect 14: The method of Aspect 13, wherein the second MSCM indicates an intent to perform a potential maneuver.

Aspect 15: The method of any of Aspects 9 to 12, wherein the first maneuver message is a maneuver sharing coordination message (MSCM) and the previously-received message is a safety message.

Aspect 16: The method of Aspect 15, wherein the safety message is a basic safety message (BSM).

Aspect 17: The method of any of Aspects 9 to 16, wherein the first vehicle is configured to communicate using a vehicle-to-everything (V2X) protocol.

Aspect 18: A method for wireless communications at a vehicle, the method comprising: receiving, at the vehicle, a plurality of maneuver messages from one or more vehicles, the plurality of maneuver messages including a same maneuver identification (ID) and one or more source IDs; and determining, at the vehicle, whether the one or more source IDs of the plurality of maneuver messages match.

Aspect 19: The method of Aspect 18, further comprising: determining, at the vehicle, that a source ID of a maneuver message from the plurality of maneuver messages is different from at least one other source ID of at least one other maneuver message from the plurality of maneuver messages; and transmitting, at the vehicle, a misbehavior report to at least one of a backend server or one or more other vehicles based on determining that the source ID of the maneuver message is different from the at least one other source ID of the at least one other maneuver message.

Aspect 20: The method of Aspect 19, wherein the at least one other maneuver message from the plurality of maneuver messages is at least one of a maneuver message indicating a request to perform a maneuver, a maneuver message indicating a reservation to perform the maneuver, or a maneuver message indicating a host vehicle canceling a performance of the maneuver.

Aspect 21: The method of any of Aspects 19 or 20, wherein the misbehavior report comprises at least one of a type of attack or a colliding maneuver message detected from the maneuver message.

Aspect 22: The method of any of Aspects 18 to 21, further comprising: determining, at the vehicle, that at least one maneuver ID of a maneuver message from the plurality of maneuver messages is a new maneuver ID; and determining, at the vehicle based on the at least one maneuver ID being a new maneuver ID, whether the one or more source IDs of the plurality of maneuver messages match.

Aspect 23: The method of any of Aspects 18 to 22, wherein the plurality of maneuver messages includes a plurality of maneuver sharing coordination messages (MSCMs).

Aspect 24: The method of any of Aspects 18 to 23, wherein the vehicle is configured to communicate using a vehicle-to-everything (V2X) protocol.

Aspect 25: An apparatus for wireless communications, comprising a memory and one or more processors (e.g., implemented in circuitry) coupled to the memory. The one or more processors are configured to: transmit a message associated with a potential maneuver by the vehicle; determine a maneuver identification (ID) for the potential maneuver based on the message; and transmit a first maneuver message for the potential maneuver, the first maneuver message including the maneuver ID.

Aspect 26: The apparatus of Aspect 25, wherein the message is a safety message.

Aspect 27: The apparatus of Aspect 26, wherein the safety message is a basic safety message (BSM).

Aspect 28: The apparatus of Aspect 25, wherein the message is a second maneuver message indicating an intent to perform the potential maneuver.

Aspect 29: The apparatus of Aspect 28, wherein the second maneuver message is a maneuver sharing coordination message (MSCM).

Aspect 30: The apparatus of any of Aspects 25 to 29, wherein the first maneuver message is a maneuver sharing coordination message (MSCM) indicating a request to perform the potential maneuver.

Aspect 31: The apparatus of any of Aspects 25 to 30, wherein the apparatus is part of a vehicle, the vehicle being configured to communicate using a vehicle-to-everything (V2X) protocol.

Aspect 32: The apparatus of any of Aspects 25 to 31, wherein, to determine the maneuver ID for the potential maneuver based on the message, the one or more processors are configured to apply a hashing algorithm to the message to generate a hashed message, the maneuver ID including the hashed message.

Aspect 33: An apparatus for wireless communications, comprising a memory and one or more processors (e.g., implemented in circuitry) coupled to the memory. The one or more processors are configured to: receive a first maneuver message from a vehicle, the first maneuver message including a first maneuver identification (ID); determine that the first maneuver ID of the first maneuver message is a new maneuver ID; and determine, based on the first maneuver ID being a new maneuver ID, whether the first maneuver ID matches a second maneuver ID determined based on a previously-received message.

Aspect 34: The apparatus of Aspect 33, wherein the one or more processors are configured to: apply a hashing algorithm to the previously-received message to generate a hashed message, the second maneuver ID including the hashed message; and compare the second maneuver ID to the first maneuver ID.

Aspect 35: The apparatus of any of Aspects 33 or 34, wherein the one or more processors are configured to: determine that the first maneuver ID is different from the second maneuver ID; and transmit a misbehavior report to at least one of a backend server or one or more other vehicles based on determining that the first maneuver ID is different from the second maneuver ID.

Aspect 36: The apparatus of Aspect 35, wherein the misbehavior report comprises at least one of a type of attack or a colliding maneuver message detected from the first maneuver message.

Aspect 37: The apparatus of any of Aspects 33 to 36, wherein the first maneuver message is a first maneuver sharing coordination message (MSCM) and the previously-received message is a second MSCM.

Aspect 38: The apparatus of Aspect 37, wherein the second MSCM indicates an intent to perform a potential maneuver.

Aspect 39: The apparatus of any of Aspects 33 to 36, wherein the first maneuver message is a maneuver sharing coordination message (MSCM) and the previously-received message is a safety message.

Aspect 40: The apparatus of Aspect 39, wherein the safety message is a basic safety message (BSM).

Aspect 41: The apparatus of any of Aspects 33 to 40, wherein the apparatus is part of an additional vehicle that is configured to communicate using a vehicle-to-everything (V2X) protocol.

Aspect 42: An apparatus for wireless communications, comprising a memory and one or more processors (e.g., implemented in circuitry) coupled to the memory. The one or more processors are configured to: receive a plurality of maneuver messages from one or more vehicles, the plurality of maneuver messages including a same maneuver identification (ID) and one or more source IDs; and determine whether the one or more source IDs of the plurality of maneuver messages match.

Aspect 43: The apparatus of Aspect 42, wherein the one or more processors are configured to: determine that a source ID of a maneuver message from the plurality of maneuver messages is different from at least one other source ID of at least one other maneuver message from the plurality of maneuver messages; and transmit a misbehavior report to at least one of a backend server or one or more other vehicles based on determining that the source ID of the maneuver message is different from the at least one other source ID of the at least one other maneuver message.

Aspect 44: The apparatus of Aspect 43, wherein the at least one other maneuver message from the plurality of maneuver messages is at least one of a maneuver message indicating a request to perform a maneuver, a maneuver message indicating a reservation to perform the maneuver, or a maneuver message indicating a host vehicle canceling a performance of the maneuver.

Aspect 45: The apparatus of any of Aspects 43 or 44, wherein the misbehavior report comprises at least one of a type of attack or a colliding maneuver message detected from the maneuver message.

Aspect 46: The apparatus of any of Aspects 42 to 45, wherein the one or more processors are configured to: determine that at least one maneuver ID of a maneuver message from the plurality of maneuver messages is a new maneuver ID; and determine, based on the at least one maneuver ID being a new maneuver ID, whether the one or more source IDs of the plurality of maneuver messages match.

Aspect 47: The apparatus of any of Aspects 42 to 46, wherein the plurality of maneuver messages includes a plurality of maneuver sharing coordination messages (MSCMs).

Aspect 48: The apparatus of any of Aspects 42 to 47, wherein the apparatus is part of a vehicle, the vehicle being configured to communicate using a vehicle-to-everything (V2X) protocol.

Aspect 49: A non-transitory computer-readable medium comprising instructions which, when executed by one or more processors, cause the one or more processors to perform operations according to any of Aspects 1 to 8.

Aspect 50: An apparatus comprising means for performing operations according to any of Aspects 1 to 8.

Aspect 51: A non-transitory computer-readable medium comprising instructions which, when executed by one or more processors, cause the one or more processors to perform operations according to any of Aspects 9 to 17.

Aspect 52: An apparatus comprising means for performing operations according to any of Aspects 9 to 17.

Aspect 53: A non-transitory computer-readable medium comprising instructions which, when executed by one or more processors, cause the one or more processors to perform operations according to any of Aspects 18 to 24.

Aspect 54: An apparatus comprising means for performing operations according to any of Aspects 18 to 24.

Aspect 53: A non-transitory computer-readable medium comprising instructions which, when executed by one or more processors, cause the one or more processors to perform operations according to any of Aspects 1 to 8, Aspects 9 to 17, and/or Aspects 18 to 24.

Aspect 54: An apparatus comprising means for performing operations according to any of Aspects 1 to 8, Aspects 9 to 17, and/or Aspects 18 to 24.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at a vehicle, the method comprising:
   transmitting, at the vehicle, a message associated with a potential maneuver by the vehicle;
   applying, at the vehicle, a hashing algorithm to the message to generate a hashed message;
   including, at the vehicle, the hashed message in a field of a first maneuver message as a maneuver identification (ID) for the potential maneuver; and
   transmitting, from the vehicle to at least one other vehicle, the first maneuver message including the hashed message as the maneuver ID for the potential maneuver.

2. The method of claim 1, wherein the message is a safety message.

3. The method of claim 2, wherein the safety message is a basic safety message (BSM).

4. The method of claim 1, wherein the message is a second maneuver message indicating an intent to perform the potential maneuver.

5. The method of claim 4, wherein the second maneuver message is a maneuver sharing coordination message (MSCM).

6. The method of claim 1, wherein the first maneuver message is a maneuver sharing coordination message (MSCM) indicating a request to perform the potential maneuver.

7. The method of claim 1, wherein the vehicle is configured to communicate with the at least one other vehicle using a vehicle-to-everything (V2X) protocol.

8. A method for wireless communications at a first vehicle, the method comprising:
   receiving, at a first vehicle, a message from a second vehicle;
   receiving, at the first vehicle after receiving the message, a first maneuver message from the second vehicle, the first maneuver message including a first maneuver identification (ID) generated based on application of a hashing algorithm to the message;
   determining, at the first vehicle, that the first maneuver ID of the first maneuver message is a new maneuver ID; and
   determining, at the first vehicle based on the first maneuver ID being a new maneuver ID, whether the first maneuver ID matches a second maneuver ID determined based on application of the hashing algorithm to the received message.

9. The method of claim 8, wherein determining whether the first maneuver ID matches the second maneuver ID includes:
   applying the hashing algorithm to the received message to generate a hashed message, the second maneuver ID including the hashed message; and
   comparing the second maneuver ID to the first maneuver ID.

10. The method of claim 8, further comprising:
    determining, at the first vehicle, that the first maneuver ID is different from the second maneuver ID; and
    transmitting, at the first vehicle, a misbehavior report to at least one of a backend server or one or more other vehicles based on determining that the first maneuver ID is different from the second maneuver ID.

11. The method of claim 10, wherein the misbehavior report comprises at least one of a type of attack or a colliding maneuver message detected from the first maneuver message.

12. The method of claim 8, wherein the first maneuver message is a first maneuver sharing coordination message (MSCM) and the received message is a second MSCM.

13. The method of claim 12, wherein the second MSCM indicates an intent to perform a potential maneuver.

14. The method of claim 8, wherein the first maneuver message is a maneuver sharing coordination message (MSCM) and the received message is a safety message.

15. The method of claim 14, wherein the safety message is a basic safety message (BSM).

16. The method of claim 8, wherein the first vehicle is configured to communicate using a vehicle-to-everything (V2X) protocol.

17. An apparatus for wireless communications, comprising:
   a memory; and
   one or more processors coupled to the memory, the one or more processors configured to:
      transmit a message associated with a potential maneuver by a vehicle;
      apply, at the vehicle, a hashing algorithm to the message to generate a hashed message;
      including the hashed message in a field of a first maneuver message as a maneuver identification (ID) for the potential maneuver; and
      transmit, to at least one other vehicle, a first maneuver message including the hashed message as the maneuver ID for the potential maneuver.

18. The apparatus of claim 17, wherein the message is a safety message.

19. The apparatus of claim 18, wherein the safety message is a basic safety message (BSM).

20. The apparatus of claim 17, wherein the message is a second maneuver message indicating an intent to perform the potential maneuver.

21. The apparatus of claim 20, wherein the second maneuver message is a maneuver sharing coordination message (MSCM).

22. The apparatus of claim 17, wherein the first maneuver message is a maneuver sharing coordination message (MSCM) indicating a request to perform the potential maneuver.

23. The apparatus of claim 17, wherein the apparatus is part of the vehicle, the vehicle being configured to communicate with the at least one other vehicle using a vehicle-to-everything (V2X) protocol.

24. An apparatus for wireless communications comprising:
- a memory; and
- one or more processors coupled to the memory, the one or more processors configured to:
  - receive a message from a vehicle;
  - receive a first maneuver message from the vehicle after receiving the message, the first maneuver message including a first maneuver identification (ID) generated based on application of a hashing algorithm to the message;
  - determine that the first maneuver ID of the first maneuver message is a new maneuver ID; and
  - determine, based on the first maneuver ID being a new maneuver ID, whether the first maneuver ID matches a second maneuver ID determined based on application of the hashing algorithm to the received message.

25. The apparatus of claim 24, wherein the one or more processors are configured to:
- apply the hashing algorithm to the received message to generate a hashed message, the second maneuver ID including the hashed message; and
- compare the second maneuver ID to the first maneuver ID.

26. The apparatus of claim 24, wherein the one or more processors are configured to:
- determine that the first maneuver ID is different from the second maneuver ID; and
- transmit a misbehavior report to at least one of a backend server or one or more other vehicles based on determining that the first maneuver ID is different from the second maneuver ID.

27. The apparatus of claim 26, wherein the misbehavior report comprises at least one of a type of attack or a colliding maneuver message detected from the first maneuver message.

28. The apparatus of claim 24, wherein the first maneuver message is a first maneuver sharing coordination message (MSCM) and the received message is a second MSCM.

29. The apparatus of claim 28, wherein the second MSCM indicates an intent to perform a potential maneuver.

30. The apparatus of claim 24, wherein the first maneuver message is a maneuver sharing coordination message (MSCM) and the received message is a safety message.

31. The apparatus of claim 30, wherein the safety message is a basic safety message (BSM).

32. The apparatus of claim 24, wherein the apparatus is part of an additional vehicle that is configured to communicate using a vehicle-to-everything (V2X) protocol.

* * * * *